United States Patent
Lee et al.

(10) Patent No.: US 10,720,973 B2
(45) Date of Patent: Jul. 21, 2020

(54) METHOD FOR ULTRA-HIGH FREQUENCY MOBILE COMMUNICATION SYSTEM TRANSRECEIVING REFERENCE SIGNAL AND FEEDBACK AND APPARATUS FOR SAME

(71) Applicant: KT CORPORATION, Gyeonggi-do (KR)

(72) Inventors: HyoJin Lee, Seoul (KR); SungHyun Kim, Seoul (KR); Young-Seok Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/075,591

(22) PCT Filed: Jan. 16, 2017

(86) PCT No.: PCT/KR2017/000507
§ 371 (c)(1),
(2) Date: Aug. 3, 2018

(87) PCT Pub. No.: WO2017/135593
PCT Pub. Date: Aug. 10, 2017

(65) Prior Publication Data
US 2019/0044584 A1    Feb. 7, 2019

(30) Foreign Application Priority Data

Feb. 4, 2016  (KR) .................. 10-2016-0013888
Feb. 26, 2016 (KR) .................. 10-2016-0023530
(Continued)

(51) Int. Cl.
*H04B 7/0417* (2017.01)
*H04J 11/00* (2006.01)
(Continued)

(52) U.S. Cl.
CPC ......... *H04B 7/0417* (2013.01); *H04B 7/0456* (2013.01); *H04B 7/0617* (2013.01);
(Continued)

(58) Field of Classification Search
CPC .. H04B 7/0417; H04B 7/0456; H04B 7/0695; H04B 7/0617; H04J 11/0079; H04L 5/0023
(Continued)

(56) References Cited

U.S. PATENT DOCUMENTS

2015/0236774 A1   8/2015  Son et al.
2016/0100373 A1*  4/2016  Chen .................. H04L 27/2613
                                                    370/350
(Continued)

FOREIGN PATENT DOCUMENTS

WO    2015/020404 A1    2/2015
WO    2015/088419 A1    6/2015
(Continued)

*Primary Examiner* — Fitwi Y Hailegiorgis
(74) *Attorney, Agent, or Firm* — IP Legal Services, LLC

(57) ABSTRACT

Provided are a method for transreceiving a beam reference signal or a beam refinement reference signal and transreceiving feedback information for same between a terminal and a base station in an ultra-high frequency mobile communication system, and to an apparatus for same. The method may include identifying a preferable symbol based on reference signal received power or reference signal received quality in a subframe in which the beam reference signal is received and transmitting radio resource management information or channel status information for an antenna port or an antenna array to the base station with respect to the preferable symbol.

13 Claims, 28 Drawing Sheets

(30) Foreign Application Priority Data

Jul. 11, 2016 (KR) .......................... 10-2016-0087298
Jul. 11, 2016 (KR) .......................... 10-2016-0087324

(51) Int. Cl.
*H04B 7/06* (2006.01)
*H04B 7/0456* (2017.01)
*H04L 5/00* (2006.01)

(52) U.S. Cl.
CPC ........ *H04B 7/0695* (2013.01); *H04J 11/0079* (2013.01); *H04L 5/0023* (2013.01); *H04L 5/0048* (2013.01)

(58) Field of Classification Search
USPC ........................................................ 375/267
See application file for complete search history.

(56) References Cited

U.S. PATENT DOCUMENTS

| | | |
|---|---|---|
| 2016/0157267 A1 | 6/2016 | Frenne et al. |
| 2016/0197659 A1 | 7/2016 | Yu et al. |
| 2016/0337056 A1 | 11/2016 | Frenne et al. |
| 2016/0345216 A1 | 11/2016 | Kishiyama et al. |
| 2018/0049238 A1 | 2/2018 | Frenne et al. |

FOREIGN PATENT DOCUMENTS

| | | |
|---|---|---|
| WO | 2015/115376 A1 | 8/2015 |
| WO | 2015/147717 A1 | 10/2015 |

\* cited by examiner

PSS/SSS for TDD in LTE

☐ Frequency Location: Center 6RBs
☐ Time Location:
　○ PSS: The 3rd OFDM symbol of subframes#1 and #6
　○ SSS: The last OFDM symbol of slots #1 and #11

RB Structure for DL LTE

*FIG.5*

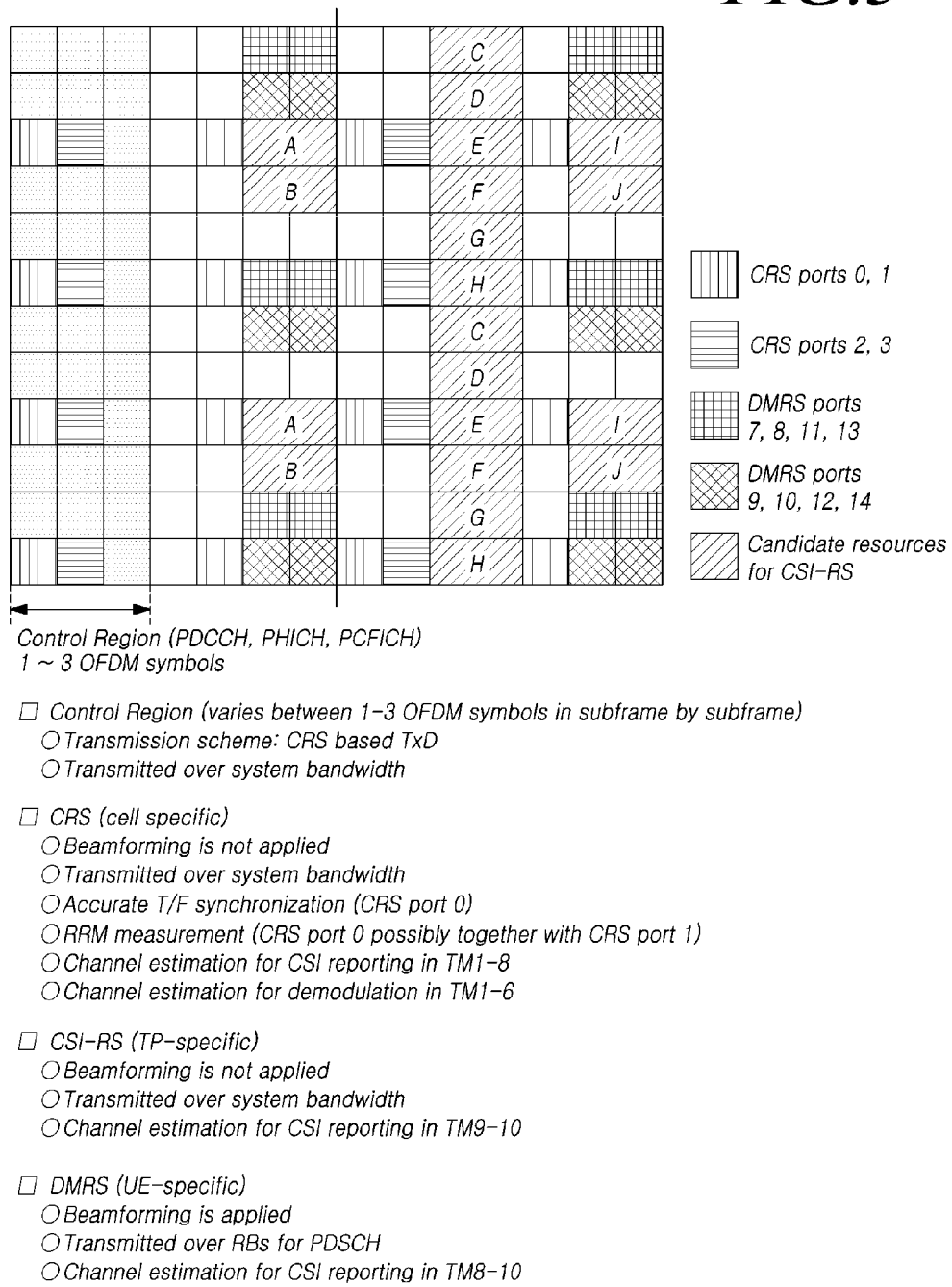

Control Region (PDCCH, PHICH, PCFICH)
1 ~ 3 OFDM symbols

☐ Control Region (varies between 1-3 OFDM symbols in subframe by subframe)
○ Transmission scheme: CRS based TxD
○ Transmitted over system bandwidth ☐ CRS (cell specific)
○ Beamforming is not applied
○ Transmitted over system bandwidth
○ Accurate T/F synchronization (CRS port 0)
○ RRM measurement (CRS port 0 possibly together with CRS port 1)
○ Channel estimation for CSI reporting in TM1-8
○ Channel estimation for demodulation in TM1-6

☐ CSI-RS (TP-specific)
○ Beamforming is not applied
○ Transmitted over system bandwidth
○ Channel estimation for CSI reporting in TM9-10

☐ DMRS (UE-specific)
○ Beamforming is applied
○ Transmitted over RBs for PDSCH
○ Channel estimation for CSI reporting in TM8-10 mmWave Time/Freq Parameters

| | | |
|---|---|---|
| CC BW (MHz) | 200 MHz | 100 MHz |
| Basic Time Unit (Ts) | 1/(150000x2048) sec | 1/(75000x2048) sec |
| Radio frame duration | 1 ms | 2 ms |
| Subframe duration | 0.1 ms | 0.2 ms |
| slots/subframe | 2 | 2 |
| OFDM symbols/slot | 7 | 7 |
| CP length | 160Ts (521ns, symbol 0), 144Ts (470ns, six following symbols) | 160Ts (1042ns, symbol 0), 144Ts (940ns, six following symbols) |
| FFT Size (N) | 2048 | 2048 |
| Sampling rate | 150000xN Hz | 75000xN Hz |
| Subcarrier spacing (Δf) | 150kHz | 75kHz |
| Occupied Subcarriers | 1201 | 1201 |
| Guard Subcarriers | 847 | 847 |

FIG. 8

Antenna Architectures for Hybrid Beamforming

☐ # of antenna arrays (AA) on one BS: 1, 2, or 4

☐ # of antenna elements (AE) on each antenna array: (M, N, P)
  ○ M: # of columns on each array
  ○ N: # of rows on each array
  ○ P: # of POLs on each antenna element ☐ Each antenna array corresponds to two antenna ports (AP)
  ○ One port is linked to one POL of MN AEs
  ○ The other port is linked to the other POL of the same MN AEs ☐ Each antenna port can generate one of the B analog beams, independently of other antenna ports

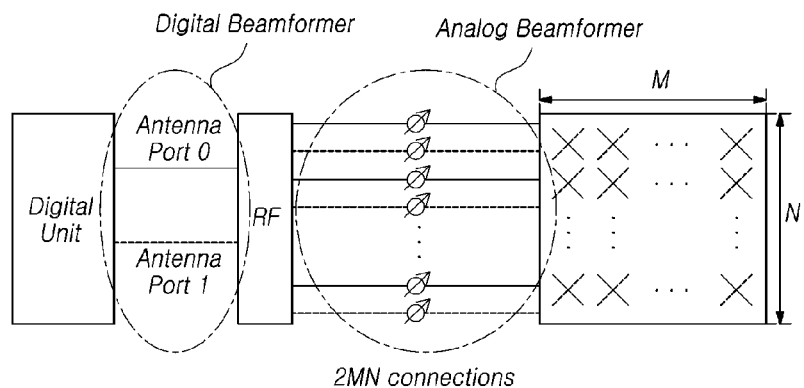

FIG.10

Initial Timing and Beam Acquisition

☐ Subframe including PSS/SSS/ESS/Beam RS (BRS) in order for initial timing and beam acquisition occurs at every K subframe: 0, K, 2K, ...
  ○ Such subframe including PSS/SSS/ESS/Beam RS is called Timing and Beam Acquisition (TBA) subframe ☐ 14 (or 12) OFDM symbols in one TBA subframe correspond to different 14 (or 12) analog beams to each other
  ○ The 1st OFDM symbol applies the 1st beams of the AAs (1, 2, 3, 4 AAs)
  ○ The 2nd OFDM symbol applies the 2nd beams of the AAs
  ○ ...
  ○ The 14th (or 12nd) OFDM symbol applies the 14th (or 12nd) beams of the AAs

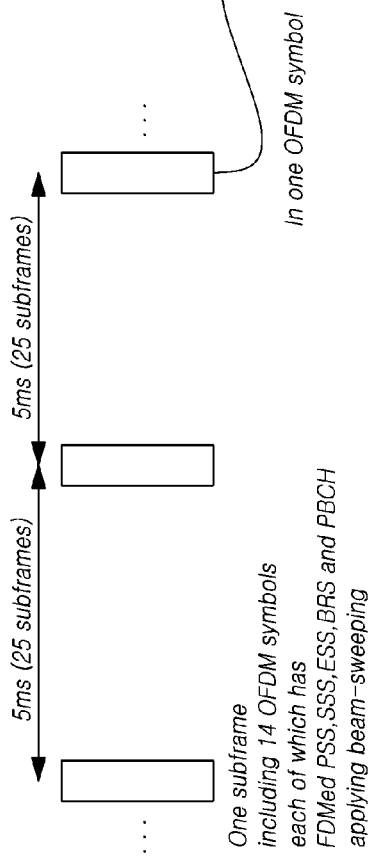

In one OFDM symbol

5ms (25 subframes)

5ms (25 subframes)

One subframe including 14 OFDM symbols each of which has FDMed PSS,SSS,ESS,BRS and PBCH applying beam-sweeping

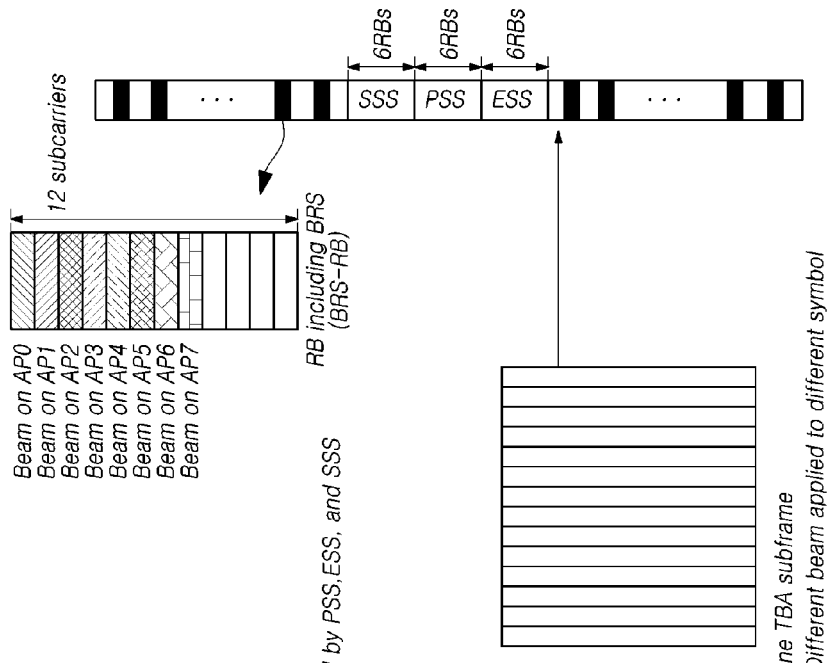

FIG. 12

Position of BRS-RB in System BW

☐ Option 1 (One-way mapping)
  ○ Every Lth RB excluding the center 18 RBs; starting from the RB with index S
  ○ The index 'S' can be [0], [f(Cell-ID) mod L] or [f(Cell-ID, Symbol index) mod L]

☐ Option 2 (Two-way mapping)
  ○ Upward, every Lth RB starting from the Sth RB right above the center 18 RBs
  ○ Downward, every Lth RB starting from the Sth RB right below the center 18 RBs
  ○ The index 'S' can be [0], [f(Cell-ID) mod L], [f(Cell-ID, Symbol index) mod L],
    [f(Cell-ID) mod (L/2)] or [f(Cell-ID, Symbol index) mod (L/2)]

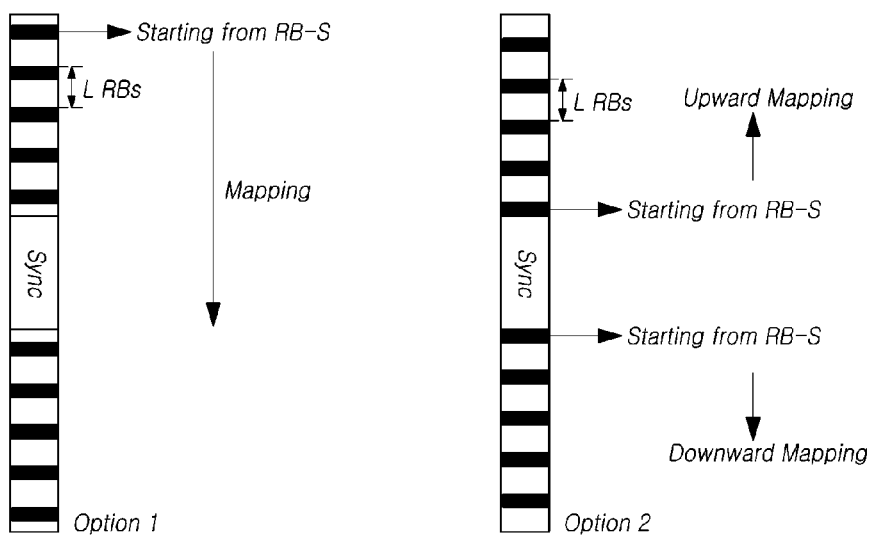

AP to RE mapping in BRS-RB

☐ Beam on AP0 is mapped to the Tth subcarrier

☐ Contiguously mapped in AP index order

☐ T = 0, [f'(Cell-ID) mod 12], or [f'(Cell-ID, Symbol index) mod 12]

FIG.14

BRS-RB design for # of APs

☐ Option 1: Nulling if there is no matched AP

○ 2AP case:
  - Subcarrier T ← AP0, Subcarrier T+1 ← AP1
  - Nulling in the other subcarriers ○ 4AP case:
  - Subcarrier T ← AP0, Subcarrier T+1 ← AP1, Subcarrier T+2 ← AP2, Subcarrier T+3 ← AP3
  - Nulling in the other subcarriers ○ 8AP case:
  - Subcarrier T ← AP0, Subcarrier T+1 ← AP1, Subcarrier T+2 ← AP2, Subcarrier T+3 ← AP3
  - Subcarrier T+4 ← AP4, Subcarrier T+5 ← AP5, Subcarrier T+6 ← AP6, Subcarrier T+7 ← AP7

☐ Option 2: Repeated mapping

○ 2AP case:
  - Subcarrier T, T+2, T+4, T+6 ← AP0, Subcarrier T+1, T+3, T+5, T+7 ← AP1

○ 4AP case:
  - Subcarrier T, T+4 ← AP0, Subcarrier T+1, T+5 ← AP1,
  - Subcarrier T+2, T+6 ← AP2, Subcarrier T+3, T+7 ← AP3

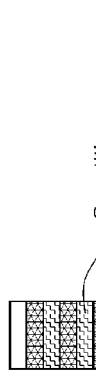
Nulling

Nulling

Data mapping in REs of BRS Nulling could be possible

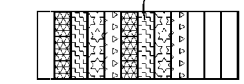
Repetition

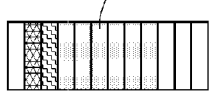
Repetition

*FIG. 15*

UE detection on # of APs

☐ Non-standalone
  ○ LTE P-cell indicates the number of APs

☐ Standalone
  ○ PBCH blind detection under the assumption of the BRS mapping in the previous page

*FIG. 16*

UE Procedure for Timing & Beam Acquisition

☐ PSS detection: Acquire OFDM symbol timing

☐ SSS detection: Acquire Cell-ID

☐ ESS detection: Acquire OFDM symbol index (0-13 or 0-11 (x2))

☐ PBCH detection: Acquire SFN (and # of BRS ports in case standalone)

☐ BRS detection: Acquire channel measurements for multiple antenna ports of multiple beams

FIG.17

RRM reports on BRS Detection (1/2)

☐ Alt 1: RRM (RSRP and/or RSRQ) of selected AAs for selected OFDM symbol indices in each of the serving and the neighboring cells
　○ AP to AA mapping:
　　– AP 0 and 1 → AA0, AP 2 and 3 → AA1, AP 4 and 5 → AA2, AP 6 and 7 → AA3
　○ Reporting information: For each of selected AAs in selected OFDM symbols
　　– Cell ID + OFDM symbol index + AA index + RSRP (and/or RSRQ)
　○ For example: If UE selects (AA0, AA1) in OFDM symbol 2 and (AA3) in OFDM symbol 5, the reporting is
　　– Cell ID + OFDM symbol 2 + AA 0 + the corresponding RSRP (and/or RSRQ)
　　– Cell ID + OFDM symbol 2 + AA 1 + the corresponding RSRP (and/or RSRQ)
　　– Cell ID + OFDM symbol 5 + AA 3 + the corresponding RSRP (and/or RSRQ)

☐ Alt 2: Four RRMs (RSRP and/or RSRQ) for selected OFDM symbol indices in each of the serving and the neighboring cells
　○ Reporting information: For each of selected OFDM symbols
　　– Cell ID + OFDM symbol index + four RRMs (for AA0, 1, 2, 3)
　○ For example: If we selects OFDM symbols 2 and OFDM symbol 5, the reporting is
　　– Cell ID + OFDM symbol 2 + the corresponding four RSRPs (and/or RSRQs)
　　– Cell ID + OFDM symbol 5 + the corresponding four RSRPs (and/or RSRQs)

FIG. 18

RRM reports on BRS Detection (2/2)

☐ Alt 3: B RRMs (RSRP and/or RSRQ) for selected OFDM symbol indices in each of
the serving and the neighboring cells
  ○ For B AAs
    – B is known by RRC or detected by PBCH (i.e. B = (# of APs)/2)
  ○ Reporting information: For each of selected OFDM symbols
    – Cell ID + OFDM symbol index + AA index + B RRM (for AA0, ⋯, B)
  ○ For example: If we selects OFDM symbols 2 and OFDM symbol 5, the reporting is
    – Cell ID + OFDM symbol 2 + the corresponding B RSRPs (and/or RSRQs) for AA0, ⋯ B-1
    – Cell ID + OFDM symbol 5 + the corresponding B RSRPs (and/or RSRQs) for AA0, ⋯ B-1

☐ Alt 4: One RRM (RSRP and/or RSRQ) for selected OFDM symbol indices in each of
the serving and the neighboring cells
  ○ Only for AA0 (mapped from AP 0 and 1)
  ○ Reporting information: For each of selected OFDM symbols
    – Cell ID + OFDM symbol index + AA index + RRM (for AA0)
  ○ For example: If we selects OFDM symbols 2 and OFDM symbol 5, the reporting is
    – Cell ID + OFDM symbol 2 + the corresponding one RSRP (and/or RSRQ) for AA0
    – Cell ID + OFDM symbol 5 + the corresponding one RSRP (and/or RSRQ) for AA0

FIG. 19

CSI reports on BRS Detection

☐ Alt 3: Q-port CSI for selected B OFDM symbol indices in the serving cell
 ○ # of APs (=Q) is indicated by RRC or detected in PBCH
 ○ Reporting information: For each of selected OFDM symbols
  − OFDM symbol index + the corresponding Q-port RI/PMI/CQI
 ○ For example: If B=2, we selects OFDM symbols 2 and OFDM symbol 5, the reporting is
  − OFDM symbol 2 + the corresponding Q-port RI/PMI/CQI
  − OFDM symbol 5 + the corresponding Q-port RI/PMI/CQI ☐ For all of the above Alt 1, 2, and 3,
 ○ B can be fixed as one
 ○ In case of initial access,
  − The above CSI is reported embedded within message-3 PUSCH
 ○ In case of connected mode,
  − If BRS is transmitted on subframe n, the above CSI is reported on PUCCH in
   subframe n+k (k would be the same value as the subframe gap between PDSCH
   and the corresponding ACK/NACK reporting
   ·Frequency resource allocation on PUCCH would be given by configured or calculated
   by RRC and/or cell-ID

FIG.21A

Detailed Structure of BRRS Occasion(1/2)

☐ Alt 1: Localized BRRS
  ○ In case of one Tx beam for each AP
    - BRRS for one AP applying the Tx beam is transmitted on localized multiple subcarriers in one OFDM symbol
    - BRRS location for APs can apply hopping across OFDM symbols
  ○ In case of multiple Tx beams in one BRRS occasion,
    - The same pattern of BRRS would be repeated applying different beams

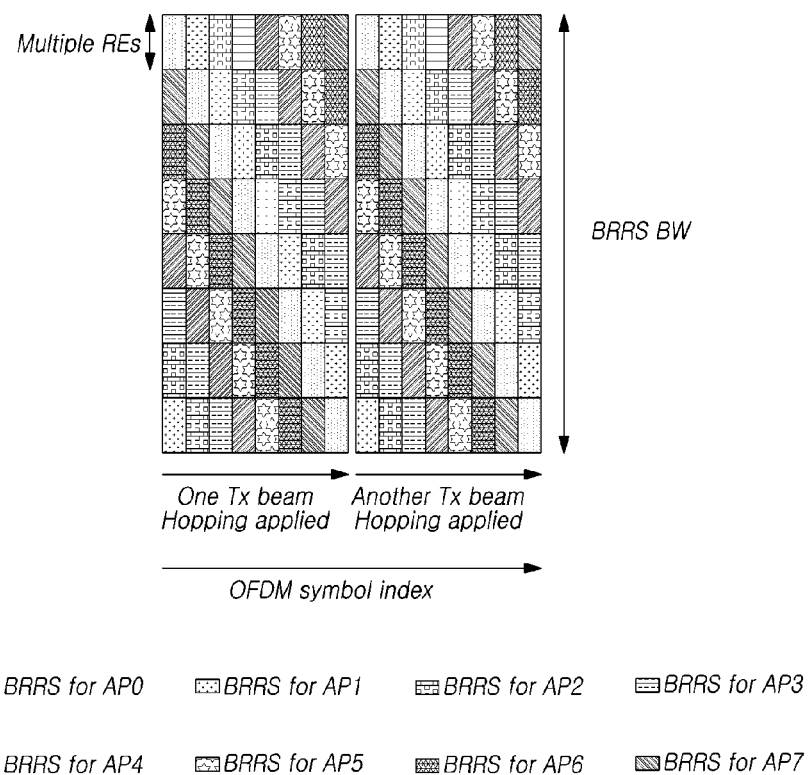

FIG.21B

Detailed Structure of BRRS Occasion(2/2)

☐ Alt 2: Distributed BRRS
  ○ In case of one Tx beam for each AP
    - BRRS for one AP applying the Tx beam is transmitted on distributed multiple subcarriers in one OFDM symbol
    - BRRS location for APs can apply hopping across OFDM symbols
  ○ In case of multiple Tx beams in one BRRS occasion,
    - The same pattern of BRRS would be repeated applying different beams

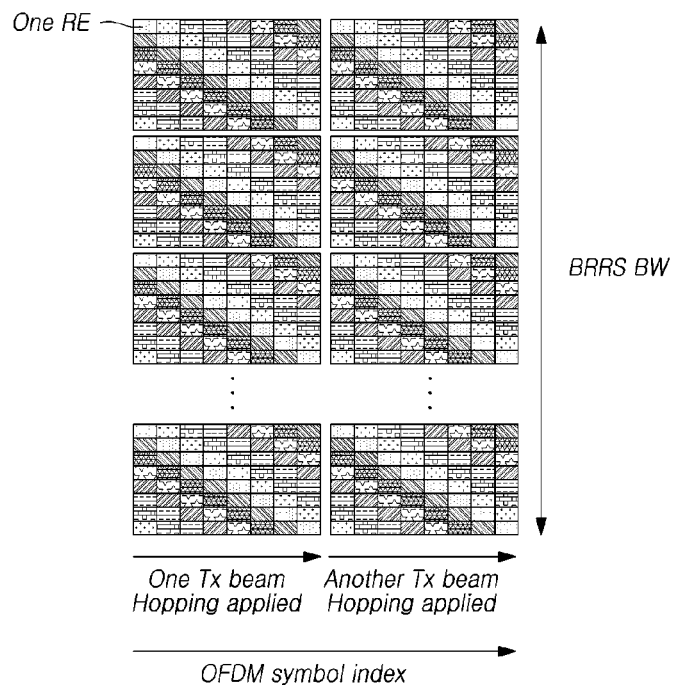

One RE

BRRS BW

One Tx beam Hopping applied    Another Tx beam Hopping applied

OFDM symbol index

▫ BRRS for AP0     ▫ BRRS for AP1     ▫ BRRS for AP2     ▫ BRRS for AP3

▫ BRRS for AP4     ▫ BRRS for AP5     ▫ BRRS for AP6     ▫ BRRS for AP7

METHOD FOR ULTRA-HIGH FREQUENCY MOBILE COMMUNICATION SYSTEM TRANSRECEIVING REFERENCE SIGNAL AND FEEDBACK AND APPARATUS FOR SAME

CROSS REFERENCE TO RELATED APPLICATIONS

This application is a National Stage Patent Application of PCT International Patent Application No. PCT/KR2017/000507 (filed on Jan. 16, 2017) under 35 U.S.C. § 371, which claims priority to Korean Patent Application Nos. 10-2016-0013888 (filed on Feb. 4, 2016), 10-2016-0023530 (filed on Feb. 26, 2016), 10-2016-0087324 (filed on Jul. 11, 2016), and 10-2016-0087298 (filed on Jul. 11, 2016), the teachings of which are incorporated herein in their entireties by reference.

BACKGROUND OF THE INVENTION

1. Field of the Invention

The present embodiments relate to a method of transmitting and receiving a reference signal and feedback information between a terminal and a base station in an ultra-high frequency mobile communication system, and an apparatus using the same.

2. Description of the Prior Art

A mobile communication system providing a voice-oriented service has been advanced to a high speed and high quality wireless packet data communication system for providing a data service and a multimedia service.

Recently, various mobile communication standards such as high speed downlink packet access (HSDPA), high speed uplink packet access (HSUPA), long term evolution (LTE), and LTE-Advanced of the 3GPP have been developed to support high speed and high quality wireless packet data transmission service. Especially, the LTE system has been developed to efficiently support high speed wireless packet data transmission and maximize a capacity of a wireless system by utilizing various wireless access technologies. The LTE-Advanced system is an advanced wireless system of the LTE system and has an improved data transmission capability in comparison to the LTE.

The LTE/LTE-Advanced systems utilize advantages of each technology by applying multiple input multiple output (MIMO) and orthogonal frequency division multiple access (OFDMA) technologies thereto.

The OFMDA enables different terminals to perform scheduling on one frequency axis, thereby providing an advantage of increasing a capacity. That is, in a case of using a characteristic of a channel changing according to time and a characteristic of a channel changing according to a frequency together, a large capacity gain may be obtained in combination with a suitable scheduling method.

Meanwhile, when the OFDM is used in a frequency band of 28 GHz that is higher than that of the LTE system aiming at 6 GHz of less, a phase noise effect between subcarriers significantly increases. Therefore, it is necessary for a subcarrier interval to be longer than that of the typical LTE system. In addition, at a high frequency, it is necessary to apply a beamforming technique using an antenna array having a plurality of antenna elements and a signal attenuation degree.

SUMMARY OF THE INVENTION

The present embodiments are directed to providing a resource utilization structure for performing data transmission and reception by utilizing given time-frequency resources when orthogonal frequency division multiple access (OFDM) is used in an ultra-high frequency mobile communication system. The present embodiments are also directed to a method of transmitting and receiving a signal between a terminal and a base station for the resource utilization structure.

In addition, the present embodiments are directed to providing a method of measuring a beam reference signal received from a base station in an ultra-high frequency mobile communication system and transmitting a feedback for the beam reference signal by a terminal.

In accordance with an embodiment, a method may be provided for receiving, by a terminal, a signal in an ultra-high frequency mobile communication system. The method includes receiving, by the terminal, a synchronization signal to which beamforming is applied at the same symbol timing and a beam reference signal through a resource block consisting of subcarriers set to multiples of 15 kHz from the base station, identifying the beamforming applied to the synchronization signal from the beam reference signal, and obtaining cell identifier information and time-frequency synchronization information from the synchronization signal.

The beam reference signal may be mapped to a resource block having a lower index among resource blocks except for a resource block to which the synchronization signal is mapped, at regular intervals.

The beam reference signal may be mapped in both directions around the resource block to which the synchronization signal is mapped, at regular intervals.

The beam reference signal may be mapped to subcarriers included in the resource block except for the resource block to which the synchronization signal is mapped and may be mapped to eight successive subcarriers among 12 units of subcarriers, and a null may be mapped to the remaining four subcarriers.

The beam reference signal mapped with the same antenna port may be repeatedly mapped to at least one subcarrier among the subcarriers to which the beam reference signal is mapped.

In accordance with another embodiment, a method may be provided for transmitting, by a base station, a signal in an ultra-high frequency mobile communication system. The method includes mapping, by the base station, a synchronization signal to which beamforming is applied to a resource block consisting of subcarriers set to multiples of 15 kHz, mapping a beam reference signal for identifying the beamforming applied to the synchronization signal to a symbol timing at which the synchronization signal is mapped, and transmitting the synchronization signal and the beam reference signal to a terminal.

In accordance with still another embodiment, a terminal may be provided for receiving a signal in an ultra-high frequency mobile communication system. The terminal includes a communication unit that receives a synchronization signal to which beamforming is applied at the same symbol timing and a beam reference signal through a resource block consisting of subcarriers set to multiples of 15 kHz from a base station, and a control unit that identifies the beamforming applied to the synchronization signal from the beam reference signal and obtains cell identifier information and time-frequency synchronization information from the synchronization signal.

In accordance with further another embodiment, a base station may be provided for transmitting a signal in an ultra-high frequency mobile communication system. The base station includes a control unit that maps a synchronization signal to which beamforming is applied to a resource block consisting of subcarriers set to multiples of 15 kHz and maps a beam reference signal for identifying the beamforming applied to the synchronization signal to a symbol timing at which the synchronization signal is mapped, and a communication unit that transmits the synchronization signal and the beam reference signal to a terminal.

In accordance with yet another embodiment, a method may be provided for transmitting feedback information by a terminal in an ultra-high frequency mobile communication system. The method includes receiving, by the terminal, a beam reference signal from a base station, identifying a preferable symbol based on reference signal received power or reference signal received quality in a subframe in which the beam reference signal is received, and transmitting radio resource management information or channel status information for an antenna port or an antenna array to the base station with respect to the preferable symbol.

In the receiving, by the terminal, of the beam reference signal from the base station, the beam reference signal may be received in eight successive subcarriers and another signal may be received in the remaining four subcarriers in a unit of 12 subcarriers in a symbol to which the beam reference signal is transmitted.

In the transmitting of the radio resource management information or the channel status information to the base station, the radio resource management information or the channel status information for a preferable antenna port or antenna array based on the reference signal received power or the reference signal received quality may be transmitted to the base station with respect to a beam reference signal port included in the preferable symbol.

The radio resource management information or the channel status information for all antenna ports or all antenna arrays may be transmitted with respect to the preferable symbol.

The radio resource management information or the channel status information for B antenna arrays or 2B antenna ports may be transmitted with respect to the preferable symbol, and the B may be a value obtained by dividing the number of identified beam reference signal antenna ports by two.

The radio resource management information or the channel status information for one specific antenna array or one specific antenna port may be transmitted with respect to the preferable symbol.

The terminal may transmit the radio resource management information or the channel status information in a subframe that is a $K^{th}$ subframe after the subframe in which the beam reference signal is received, and the K may be a value equal to a difference between a subframe in which the terminal receives data and a subframe in which the terminal transmits feedback information for the data.

The method of transmitting, by the terminal, the feedback information may further include receiving a beam refinement reference signal from the base station, and transmitting feedback information for the received beam refinement reference signal to the base station.

The beam refinement reference signal may be scheduled in an $N^{th}$ subframe and may be received in an $(N+R)^{th}$ subframe, and the feedback information may be transmitted in an $(N+R+K')^{th}$ subframe.

The R may be a fixed value or a value determined according to an index of the scheduled subframe.

In accordance with further still another embodiment, a method of a base station may be provided for receiving feedback information in an ultra-high frequency mobile communication system. The method includes transmitting a beam reference signal to a terminal and receiving radio resource management information or channel status information for an antenna port or an antenna array with respect to a preferable symbol based on reference signal received power or reference signal received quality in a subframe in which the beam reference signal is transmitted.

In accordance with further yet another embodiment, a terminal may be provided for transmitting feedback information in an ultra-high frequency mobile communication system. The terminal includes a communication unit that receives a beam reference signal from a base station, and a control unit that generates the feedback information including radio resource management information or channel status information for an antenna port or an antenna array with respect to a preferable symbol based on reference signal received power or reference signal received quality in a subframe in which the beam reference signal is received and transmits the generated feedback information to the base station through the communication unit.

In accordance with further another embodiment, a base station may be provided for receiving feedback information in an ultra-high frequency mobile communication system. The base station includes a communication unit that transmits a beam reference signal to a terminal and receives radio resource management information or channel status information for an antenna port or an antenna array with respect to a preferable symbol based on reference signal received power or reference signal received quality in a subframe in which the beam reference signal is received, and a control unit that maps data to be transmitted to the terminal to a specific resource using the received radio resource management information or channel status information.

Advantageous Effects

According to the present embodiments, in an ultra-high frequency mobile communication system, it is possible to reduce phase noise between subcarriers, overcome signal attenuation, and transmit and receive a signal between a terminal and a base station.

According to the present embodiments, in an ultra-high frequency mobile communication system, a beam reference signal or a beam refinement reference signal is measured, and a time for transmitting a feedback is secured. Therefore, it is possible to transmit and receive a signal while adjusting a beam applied to a signal that is transmitted to a terminal according to a measurement result.

BRIEF DESCRIPTION OF THE DRAWINGS

FIG. 5 is a diagram illustrating a method of using signal in the radio resources of one subframe and one resource block that are the minimum unit capable of downlink scheduling in the LTE/LTE-Advanced systems.

FIG. 8 is a diagram illustrating an antenna structure used for transmitting a signal by forming a beam in an ultra-high frequency mobile communication system.

FIG. 10 is a diagram illustrating transmitting a timing and beam acquisition subframe having a period of 5 ms.

FIG. 11 is a diagram illustrating functions of signals transmitted in the timing and beam acquisition subframe and a related structure in detail.

FIG. 12 is a diagram illustrating methods of determining positions of resource blocks to which a beam reference signal shown in FIG. 11 is transmitted.

FIG. 14 is a diagram illustrating possible mapping relationships of beams for each port and a subcarrier that may be the beam reference signal with respect to the total antenna port number of a specific base station.

FIG. 15 illustrates methods of identifying the number of the antenna ports used in the base station by the terminal.

FIG. 16 illustrates operations performed when the terminal receives signals that are present in the timing and beam acquisition subframe in an initial ultra-high frequency cell access situation.

FIGS. 17 and 18 illustrate methods of calculating and reporting radio resource management information such as reference signal received power (RSRP) or reference signal received quality (RSRQ) information by the terminal receiving a channel from the beam reference signal.

FIG. 19 illustrates methods of calculating and reporting channel status information such as rank indicator (RI)/precoding matrix indicator (PMI)/channel quality indicator (CQI) by the terminal receiving the channel from the beam reference signal.

FIGS. 21A and 21B are diagrams illustrating a structure of time frequency resources to which the beam refinement reference signal is transmitted.

DETAILED DESCRIPTION OF THE EXEMPLARY EMBODIMENTS

Figure 1:
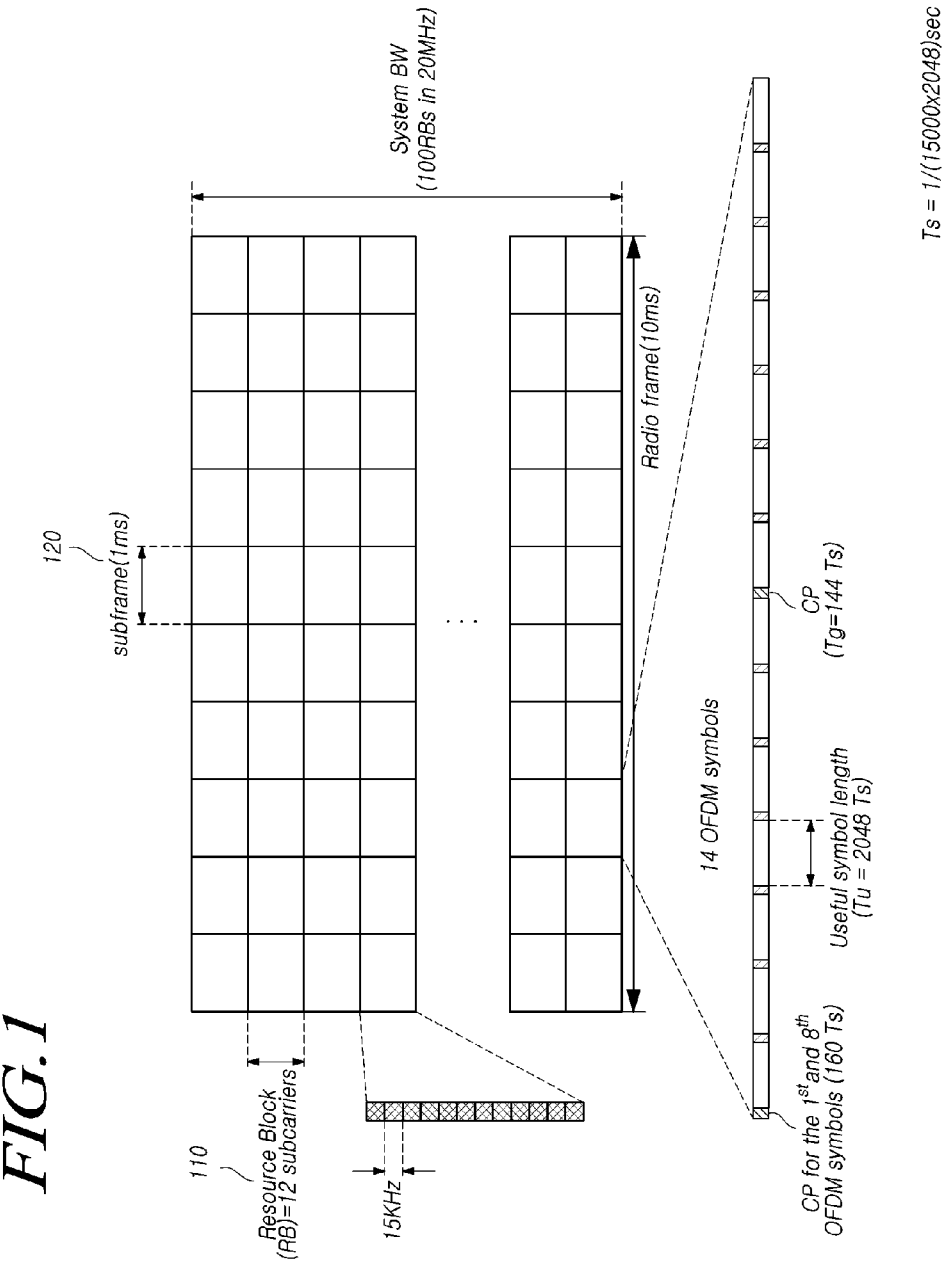
FIG. 1 is a diagram illustrating time and frequency resources in long term evolution (LTE)/LTE-Advanced systems.

Hereinafter, some embodiments of the present disclosure will be described in detail with reference to the accompanying drawings. In adding reference numerals to elements in each drawing, the same elements may have the same reference numerals, if possible, even though the elements are shown in different drawings. Further, in the following description of the present invention, a detailed description of known configurations or functions incorporated herein will be omitted when it is determined that the description may make the subject matter of the present invention rather unclear.

In addition, in describing elements of the present disclosure, terms such as "first," "second," "A," "B," "(a)," and "(b)" may be used. Such terms are intended to distinguish an element from another element, and the nature, order, sequence, number, or the like is not limited by the terms. In a case where it is described that an element is "connected" to, "combined" with, or "accesses" another element, the element may be directly connected to or access another element, however, it should be understood that another element may be interposed between each element, or each element may be "connected" to, "combined" with, or "access" the other element through another element.

In the present specification, a machine type communication (MTC) terminal may refer to a terminal that supports low cost (or low complexity), a terminal that supports coverage enhancement, or the like. Alternatively, in the present specification, the MTC terminal may refer to a terminal that is defined as a specific category for supporting low cost (or low complexity) and/or coverage enhancement.

In other words, in the present specification, the MTC terminal may refer to a newly defined $3^{rd}$ generation partnership project (3GPP) Release-13 low cost (or low complexity) user equipment (UE) category/type that executes an LTE-based MTC related operation. Alternatively, in the present specification, the MTC terminal may refer to a UE category/type that is defined in or before 3GPP Release-12 that supports the enhanced coverage or supports low power consumption in comparison with the existing LTE coverage, or may refer to a newly defined Release-13 low cost(or low complexity) UE category/type.

A wireless communication system is disposed for providing various communication services such as a voice service and a packet data service. The wireless communication system includes a UE and a base station (BS) or an evolved node-B (eNB). In the specification, the UE is a comprehensive concept that means a terminal in wireless communication. The UE should be construed as a concept including UE in wideband code division multiple access (WCDMA), LTE, high speed packet access (HSPA), or the like, and a mobile station (MS), a user terminal (UT), an subscriber station (SS), a wireless device, and the like in global systems for mobile communication (GSM).

A BS or a cell may generally refer to a station where performs communication with a UE, and the BS or the cell may be referred to as another term such as a node-B, an eNB, a sector, a site, a base transceiver system (BTS), an access point, a relay node, a remote radio head (RRH), a radio unit (RU), and a small cell.

That is, the BS or the cell in the specification should be construed as a comprehensive meaning indicating some area or a function covered by a BS controller (BSC) in CDMA, a node-B in WCDMA, an eNB in LTE, a sector (site), or the like. The BS or the cell means inclusively all of various coverage areas such as a megacell, a macrocell, a microcell, a picocell, a femtocell, a relay node, an RRH, an RU, and a small cell communication range.

Each of the above-described various cells has a BS that controls a corresponding cell, and thus, the BS may be construed in two ways: i) the BS may be a device that provides a megacell, a macrocell, a microcell, a picocell, a femtocell, and a small cell in association with a wireless area, or ii) the BS may indicate a wireless area itself. In item i), the BS may be i) devices that interact with one another and controlled by an identical entity to enable the devices for providing a predetermined wireless area and or ii) devices that cooperatively configure the wireless area. According to a configuration type of the wireless area, the BS may be referred to as an eNB, an RRH, an antenna, an RU, a low power node (LPN), a point, a transmission/reception point, a transmission point, a reception point, or the like. In item ii), the BS is a wireless area itself that receives or transmits a signal from a perspective of a terminal or a neighboring BS.

Thus, the megacell, the macrocell, the microcell, the picocell, the femtocell, the small cell, the RRH, the antenna, the RU, the LPN, the point, the eNB, the transmission/reception point, the transmission point, and the reception point are collectively referred to as the BS.

In the specification, the UE and the BS are used as two inclusive transmitting and receiving subjects to implement the technology and technical spirit described in the present specification, but not limited to a predetermined term or word. The UE and the BS are used as two (uplink (UL) or downlink (DL)) inclusive transmitting and receiving subjects to implement the technology and technical spirit described in the present specification, but not limited to a predetermined term or word. Here, the UL refers to data transmission and reception from the UE to the BS, and the DL refers to data transmission and reception from the BS to the UE.

A multiple access scheme may be unrestrictedly applied to a wireless communication system. Various multiple access schemes may be used. The multiple access schemes may include code division multiple access (CDMA), time division multiple access (TDMA), frequency division multiple access (FDMA), orthogonal frequency division multiple access (OFDMA), OFDM-FDMA, OFDM-TDMA, and OFDM-CDMA. An embodiment of the present disclosure may be applied to resource allocation in asynchronous wireless communication that evolves into LTE/LTE-Advanced through GSM, WCDMA, and HSPA. Furthermore, embodiments of the present disclosure may be applied to resource allocation in a synchronous wireless communication field or the like that evolves into CDMA, CDMA-2000, and UMB. The embodiments of the present disclosure should not be construed to be restricted to or limited to a specific wireless communication field and should be construed as including all technical fields to which the spirit of the present invention may be applied.

UL transmission and DL transmission may be performed using one of i) a time division duplex (TDD) scheme that performs transmission using different times and ii) a frequency division duplex (FDD) scheme that performs transmission using different frequencies.

In addition, in a system such as LTE and LTE-Advanced, the UL and the DL are configured based on one carrier or a pair of carriers according to a standard. The UL and the DL transmit control information through a control channel such as a physical DL control channel (PDCCH), a physical control format indicator channel (PCFICH), a physical hybrid ARQ indicator channel (PHICH), a physical UL control channel (PUCCH), and an enhanced physical DL control channel (EPDCCH). The UL and the DL are configured with a data channel such as a physical DL shared channel (PDSCH) and a physical UL shared channel (PUSCH) so as to transmit data.

Meanwhile, the control information may be transmitted using an enhanced PDCCH or an extended PDCCH (EPDCCH).

In the specification, a cell may refer to a coverage of a signal transmitted from a transmission/reception point, a component carrier having the coverage of the signal transmitted from the transmission/reception point (transmission point or transmission/reception point), or the transmission/reception point itself.

A wireless communication system to which the embodiments are applied may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and terminals.

The multiple transmission/reception points may be at least one RRH that is connected to the BS or the macrocell (hereinafter, referred to as 'eNB') and the eNB through an optical cable or an optical fiber to be controlled in a wired manner, and the multiple transmission/reception points have high transmission power or low transmission power in a macrocell area.

Hereinafter, the DL refers to communication or a communication path from multiple transmission/reception points to a terminal, and the UL refers to communication or a communication path from the terminal to the multiple transmission/reception points. In the DL, a transmitter may be a part of the multiple transmission/reception points and a receiver may be a part of the terminal. In the UL, the transmitter may be a part of the terminal and the receiver may be a part of the multiple transmission/reception points.

Hereinafter, "a signal is transmitted and received through a channel such as a PUCCH, a PUSCH, a PDCCH, an EPDCCH, or a PDSCH" has the same meaning of "transmission and reception of the PUCCH, the PUSCH, the PDCCH, the EPDCCH, or the PDSCH".

In addition, hereinafter, a description of transmitting or receiving a PDCCH or a description of transmitting or receiving a signal through the PDCCH may have the same meaning of transmitting or receiving an EPDCCH or transmitting or receiving a signal through the EPDCCH.

That is, a physical DL control channel described below may mean the PDCCH, mean the EPDCCH, or mean both the PDCCH and the EPDCCH.

In addition, for convenience of description and ease of understanding, the EPDCCH, which is an embodiment of the present invention, may also be applied to a portion described with the PDCCH, and the PDCCH may also be applied to a portion described with the EPDCCH as an embodiment.

Meanwhile, high layer signaling described below includes radio resource control (RRC) signaling which transmits RRC information including an RRC parameter.

The eNB performs DL transmission to terminals. The eNB may transmit a PDSCH which is a main physical channel for unicast transmission, DL control information such as scheduling required to receive the PDSCH, and a PDCCH for transmitting scheduling approval information for transmission through an UL data channel (for example, a PUSCH). Hereinafter, transmission and reception of a signal through each channel will be described as transmission and reception of a corresponding channel.

A mobile communication system for a voice-oriented service has been advanced to a high speed and high quality wireless packet data communication system to provide data service and multimedia service. Recently, various mobile communication standards such as high speed DL packet access (HSDPA), high speed UL packet access (HSUPA), long term evolution (LTE), and long term evolution-advanced (LTE-Advanced) of the 3GPP have been developed to support high speed and high quality wireless packet data transmission service.

Especially, the LTE system is a system developed to efficiently support high speed wireless packet data transmission and maximizes a capacity of a wireless system by utilizing various wireless access technologies. The LTE-Advanced system is an advanced wireless system of the LTE system and has an improved data transmission capability compared to the LTE.

Generally, LTE refers to a BS or a terminal device corresponding to Release 8 or Release 9 of the 3GPP standard organization, and LTE-Advanced refers to a BS or a terminal device corresponding to Release 10 of the 3GPP standard organization. After standardization of LTE-Advanced, the 3GPP standard organization is working on a standard for a follow-up release having an improved performance on the basis of the standardization of LTE-Advanced.

The LTE/LTE-Advanced systems utilize advantages of each technology by applying multiple input multiple output (MIMO) and orthogonal frequency division multiple access (OFDMA) technologies thereto.

First, the MIMO that transmits a wireless signal using a plurality of transmission antennas is classified into signal user MIMO (SU-MIMO) that transmits data to one terminal and multi-user MIMO (MU-MIMO) that transmits data to a plurality of terminals using the same time/frequency resources.

In the case of the SU-MIMO, a plurality of transmission antennas transmit a wireless signal to a plurality of spatial layers with respect to one receiver. In this case, the receiver should include a plurality of reception antennas in order to support the plurality of spatial layers.

On the other hand, in the case of the MU-MIMO, the plurality of transmission antennas transmit the wireless signal to the plurality of spatial layers with respect to a plurality of receivers. The MU-MIMO has advantages that the receiver does not need a plurality of reception antennas as compared to the SU-MIMO. However, the MU-MIMO has disadvantages that mutual interference may occur between wireless signals for different receivers because the wireless signal is transmitted to the plurality of receivers on the same frequency and time resources.

One of main factors for obtaining a capacity increase through the OFDMA is the performance of scheduling of different terminals on a frequency axis. That is, when a characteristic of a channel changing according to time and a characteristic of a channel changing according to a frequency are additionally used, a large capacity gain may be obtained in combination with a suitable scheduling method.

FIG. 1 illustrates time and frequency resources in LTE/LTE-Advanced systems.

Referring to FIG. 1, radio resources transmitted from a BS (e.g., evolved NodeB or eNB) to a terminal (or e.g., UE) are divided into units of resource blocks (RBs) 110 and are divided into units of subframes 120.

In the LTE/LTE-Advanced systems, the resource block 110 generally consists of 12 subcarriers, a subcarrier interval is 15 kHz, and one resource block 110 occupies a bandwidth of 180 kHz.

On the other hand, in the LTE/LTE-Advanced systems, the subframe 120 consists of 14 OFDM symbol intervals and occupies a time period of 1 msec.

Here, each OFDM symbol interval includes a cyclic prefix (CP). First and eighth OFDM symbols include a CP of 160 Ts length and other OFDM symbols include a CP of 144 Ts length. Here, the Ts is a basic time unit of the LTE/LTE-Advanced systems and corresponds to $1/(15000 \times 2048)$ seconds.

In performing scheduling, the LTE/LTE-Advanced systems may allocate resources in units of the subframes 120 on a time axis and may allocate the resources in units of the resource blocks 110 on a frequency axis.

Figure 2:
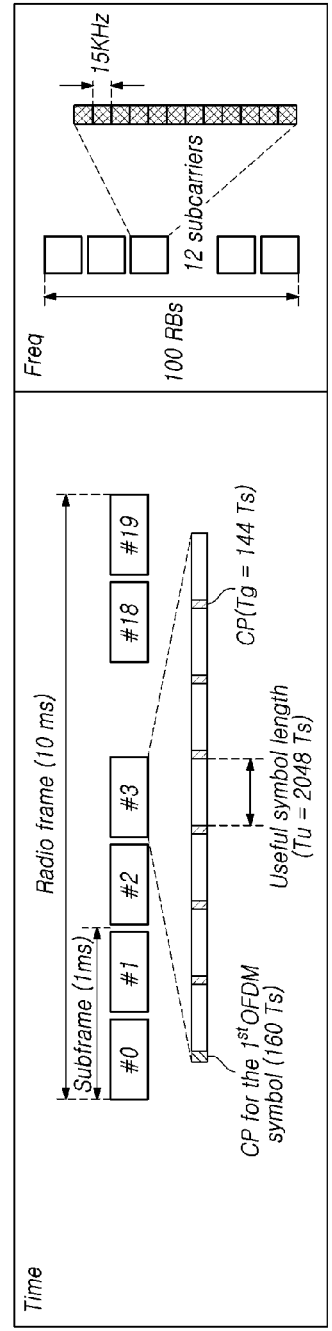
FIG. 2 is a diagram illustrating time-frequency parameters used in LTE.

FIG. 2 illustrates time-frequency parameters used in LTE in detail.

In the typical LTE system, a BS transmits a primary synchronization signal (PSS) and a secondary synchronization signal (SSS) in a regular time-frequency position, a terminal receives a corresponding signal to obtain synchronization, so that the terminal obtains time-frequency synchronization with a specific cell.

Figure 3:
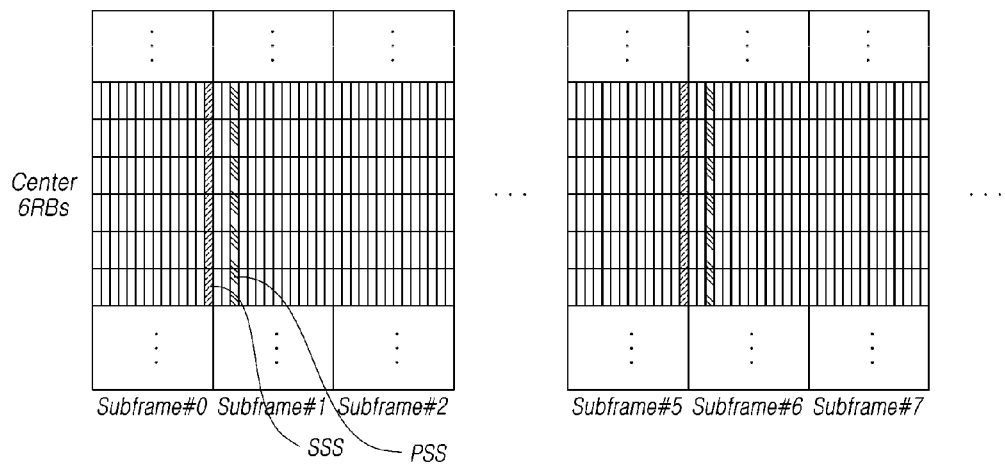
FIG. 3 is a diagram illustrating primary synchronization signal (PSS) and secondary synchronization signal (SSS) positions used in the LTE system operating with time division duplex (TDD).

FIG. 3 illustrates PSS and SSS positions used in the LTE system operating with TDD.

Referring to FIG. 3, in the LTE system operating with TDD, the PSS is positioned at a third OFDM symbol of a subframe #1 and a subframe #6, and the SSS is positioned at a last OFDM symbol of a slot #1 and a slot #11.

Figure 4:
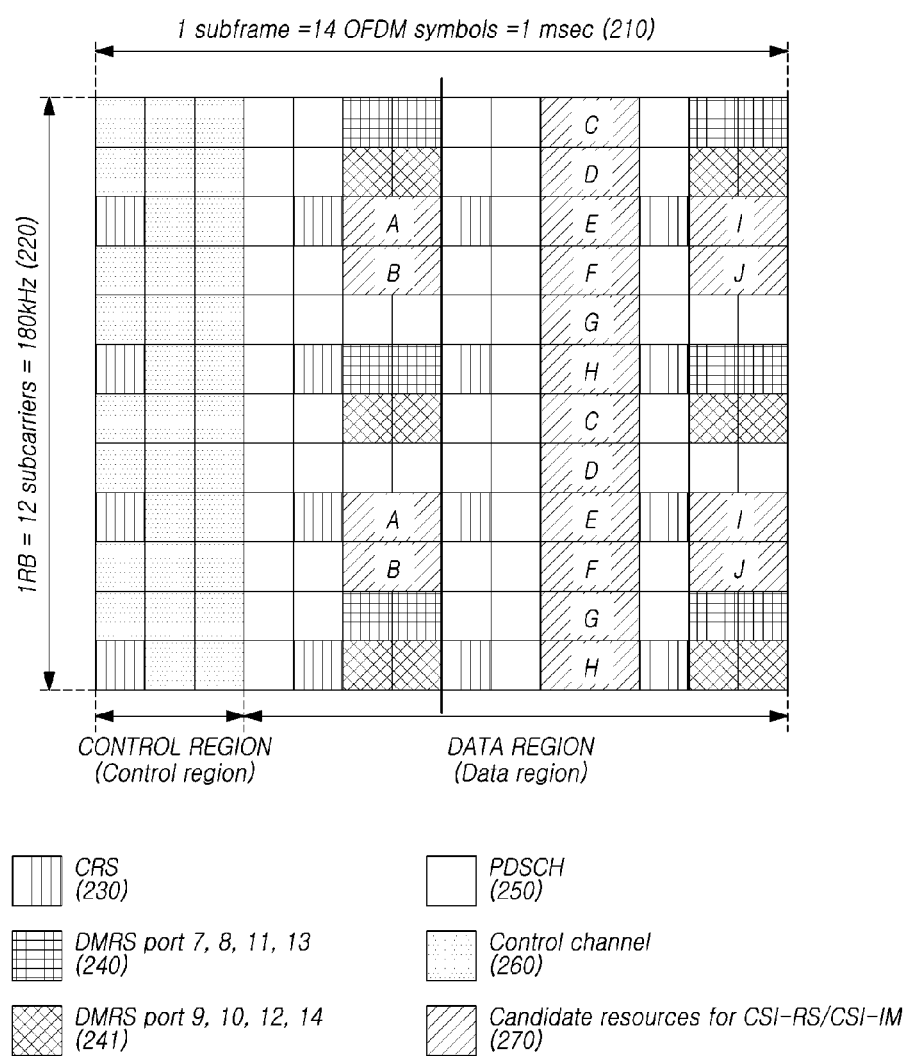
FIG. 4 is a diagram illustrating radio resources of one subframe and one resource block that are a minimum unit capable of downlink scheduling in the LTE/LTE-Advanced systems.

FIG. 4 illustrates radio resources of one subframe and one resource block that are a minimum unit capable of DL scheduling in the LTE/LTE-Advanced systems.

Referring to FIG. 4, a DL scheduling unit of the LTE/LTE-Advanced systems consists of one subframe 210 on a time axis and consists of one resource block 220 on a frequency axis.

Such radio resources consist of 12 subcarriers in a frequency area and consist of 14 OFDM symbols in a time area. Therefore, the radio resources have a total of 168 unique frequency and time positions.

In the LTE/LTE-Advanced, each of unique frequency and time positions of FIG. 2 is referred to as a resource element (RE). In addition, one subframe consists of two slots each consisting of seven OFDM symbols.

The following plurality of different kinds of signals may be transmitted to radio resources shown in FIG. 4.

1. Cell-specific resource signal (CRS) 230: a reference signal transmitted for channel measurement of all terminals belonging to a specific cell 2. Demodulation reference signal (DMRS) 240 and 241: a reference signal transmitted for data demodulation of a specific terminal 3. Channel status information reference signal (CSI-RS) 270: the CSI-RS is a reference signal transmitted to a terminal belonging to a specific signal transmission point and is used for measuring a channel status. Since a plurality of transmission points may be included in one cell, a plurality of CSI-RSs may be transmitted from one cell.

4. Physical DL shared channel (PDSCH) 250: a data channel transmitted in the DL. The PDSCH is used for the BS to transmit data to the terminal, and the PDSCH is transmitted using resource units through which a reference signal is not transmitted in a data area of FIG. 4.

5. Control channel (a PDCCH, a PCFICH and a PHICH) 260: ACK/NAK transmission for control information necessary for the terminal to receive a PDSCH or an UL HARQ operation. The control channel may occupy one to three OFDM symbols per each subframe, and the number of the OFDM symbols for a corresponding control channel is notified to the terminal through the PCFICH.

In addition to the above-described signals, the LTE-Advanced system may set muting to enable the terminals of a corresponding cell to receive the CSI-RS 270 transmitted by another BS without interference.

The muting may be applied at a position where the CSI-RS 270 may be transmitted. In general, the terminal receives a data signal by skipping corresponding radio resources. In the LTE-Advanced system, the muting is also referred to as a zero-power CSI-RS as another term. Because the muting is applied to a position of the CSI-RS 270, transmission power is zero, and no signal is transmitted.

The CSI-RS 270 may be transmitted using some of the positions denoted by A, B, C, D, E, F, G, H, I, and J according to the number of antennas that transmit the CSI-RS 270. In addition, the muting may also be applied to a use of the some of the positions denoted by A, B, C, D, E, F, G, H, I, and J.

The number of antenna ports (APs) supported by the LTE-Advanced system is two, four, and eight, and the CSI-RS may be transmitted using two, four, and eight resource units with respect to each two, four, and eight APs. When the number of the APs is two, the CSI-RS 270 is transmitted to half of a specific pattern in FIG. 4. When the number of the APs is four, the CSI-RS is transmitted to the entire specific pattern. When the number of the APs is eight, the CSI-RS is transmitted using two successive patterns. On the other hand, the muting consists of one pattern unit.

As described above, in order to increase a data transmission rate and a system capacity, the LTE/LTE-Advanced systems utilize the MIMO technology that transmits data using a plurality of transmitting and receiving antennas. Until now, the LTE-Advanced system supports up to eight APs per each terminal and transmission of up to eight spatial layers at a time is supported.

A terminal accessing a corresponding specific BS measures a DL channel using the CSI-RS and reports channel information for the DL channel to the BS so that the specific BS performs terminal scheduling for the given time/frequency resources and determines a precoding method to be applied to a plurality of antennas.

In the LTE/LTE-Advanced systems, the following three pieces of channel feedback information (CSI) are used:

Rank indicator (RI): information on number of spatial layers preferred by the terminal Precoding matrix indicator (PMI): index information of a precoding matrix preferred by the terminal in a given situation in which the most recent RI is reported Channel quality indicator (CQI): maximum modulation and coding scheme (MCS) level information satisfying block error rate (BLER) of 0.1 in a given situation the most recent RI/PMI/CQI are reported Detailed definition and a reporting period for the RI/PMI/CQI are referenced in the 3GPP standard document [3GPP TS 36.213]

FIG. 5 illustrates a method of using signal at each area in the radio resources of one subframe and one resource block that are the minimum unit capable of DL scheduling in the LTE/LTE-Advanced systems.

In the LTE/LTE-Advanced system, the terminal identifies the physical DL control channel in each subframe to identify whether data (PDSCH) is transmitted in a corresponding subframe.

Here, as described above, the PDCCH may occupy one to three OFDM symbol areas in each subframe. The terminals may identify the number of OFDM symbols used as the PDCCH by receiving the PCFICH.

That is, the BS sets the PCFICH to one among 1, 2, and 3 according to a size of a necessary control channel in a specific subframe, transmits the PCFICH to terminals in a cell, and transmits the PDCCH in an area of a set value. In addition, the PDCCH is transmitted over the entire system band, and scheduling information to a specific terminal is spread and transmitted across the entire system band.

The scheduling information included in the PDCCH includes some or all of the following pieces of information for the terminals receiving data in a corresponding subframe.

PDSCH resource allocation information

Modulation method and encoding rate information
 HARQ information

Re-transmission/initial transmission division information

Figure 6:
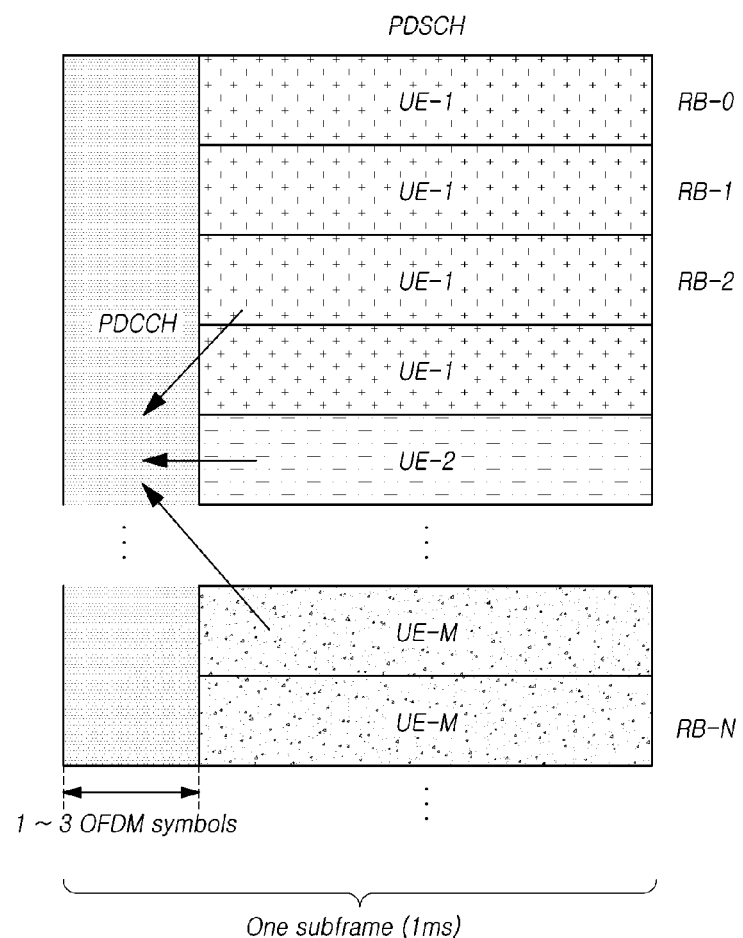
FIG. 6 is a diagram for describing an operation for identifying scheduling information using a physical downlink control channel (PDCCH) area.

Referring to FIG. 6 for describing in more detail, the terminal identifies a PDCCH area in which one to three OFDM symbols are possible in a specific subframe to identify whether scheduling of the PDSCH transmitted to the terminal occurs.

Here, when the scheduling occurs, a resource block on which a corresponding PDSCH is positioned on a frequency is identified. Then the PDSCH is received from remaining OFDM symbols except for a control area with respect to corresponding resource blocks in a corresponding subframe to perform decoding.

FIG. 6 is a diagram illustrating a case where M terminals identify PDSCH scheduling in a specific subframe. A position of the PDSCH to be received by each terminal is identified by information in the PDCCH that is present in the entire band that is common to all terminals of a corresponding cell.

In addition, in the typical LTE/LTE-Advanced systems, the terminal should identify the PDCCH at front side OFDM symbols of a specific subframe and receive the PDSCH at all of the remaining back side OFDM symbols for enabling the terminal to decode the entire one data unit. That is, in the LTE/LTE-Advanced systems, a data reception unit of the terminal is 1 ms as one subframe.

Since the LTE/LTE-Advanced systems are designed under an assumption that the data reception unit of the terminal is 1 ms in a frequency band of 6 GHz or less, signals for utilizing the time-frequency resource structure as described above and corresponding resources are designed.

However, in a mobile communication system using OFDM in a high frequency band such as 28 GHz, a phase noise effect between subcarriers increases. Accordingly, it is necessary to have a subcarrier interval larger than that of the LTE system aiming at 6 GHz or less. In addition, since an attenuation degree of a signal is increased according to distance at a high frequency, it is necessary to transmit a stronger signal in a specific direction by applying a beamforming technique to a signal.

Therefore, in accordance with at least one embodiment, a new time-frequency resource utilization structure may be provided to be used in a high frequency mobile communication system, and a method of a terminal and a base station may be provided for transmitting and receiving a signal through the new time-frequency resource utilization structure.

Specifically, in accordance with at least one embodiment, a resource utilization structure may be provided for enabling data transmission and reception by utilizing given time-frequency resources when OFDM is used in a high frequency mobile communication system using a frequency band of several tens of GHz, and furthermore, a method of a terminal and a BS may be provided for signal transmission and reception for the resource utilization structure.

As described above, in the frequency band of several tens of GHz, the phase noise effect between the subcarriers increases, and thus a large subcarrier interval is required. In addition, in the frequency band of several tens of GHz, usable frequency units of several hundreds of MHz are present, and thus a large subcarrier interval is necessary to be maintained.

In the embodiments, a value corresponding to a multiple of 15 kHz which is an interval of a subcarrier of the LTE is set in order to maintain a large subcarrier interval with a time-frequency structure similar to that of the typical LTE in a new high frequency mobile communication system.

That is, in consideration of a channel environment in a frequency band around about 30 GHz, it is efficient to have a subcarrier interval of about five times or ten times as large as 15 kHz. Thus, in the embodiments, a subcarrier interval of 75 kHz or a subcarrier interval of 150 kHz may be used.

Figure 7:
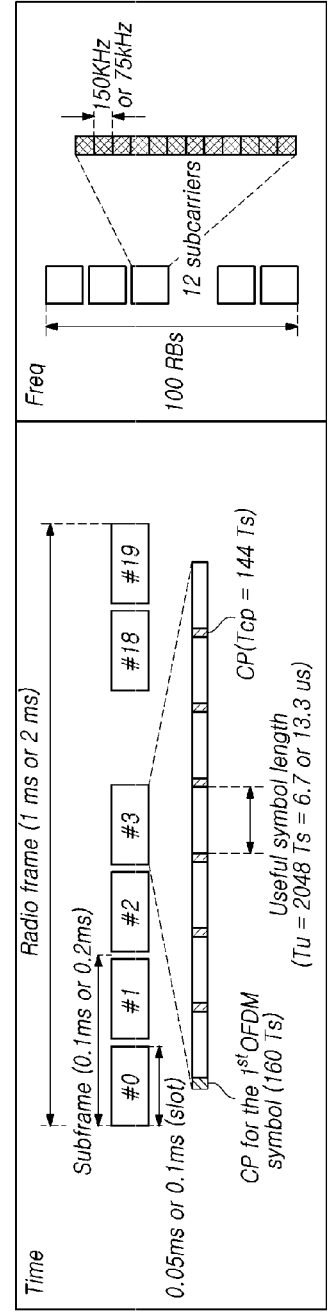
FIG. 7 is a diagram illustrating time-frequency resources and corresponding system parameters for subcarrier intervals of each of 150 kHz and 75 kHz.

FIG. 7 illustrates time-frequency resources and corresponding system parameters for subcarrier intervals of each of 150 kHz and 75 kHz.

Referring to FIG. 7, if an OFDM system uses 2048 fast Fourier transform (FFT), the entire system band may consist of each of 200 MHz and 100 MHz, and one subframe may consist of each of 0.1 ms and 0.2 ms. Therefore, the high frequency mobile communication system may basically have a resource block, a subframe, and a radio frame of types equal to those of the LTE/LTE-Advanced.

That is, the resource block consists of 12 subcarriers, the subframe consists of 14 OFDM symbols, and a wireless frame consists of 10 subframes.

The high frequency mobile communication system may generate serious attenuation of a signal according to a distance. Accordingly, it is necessary to apply beamforming that gives directivity to all transmission signals in order to compensate for the attenuation.

That is, a signal is transmitted by forming beam to collect an intensity of the signal in a specific direction. When the signal is far from the specific direction, the signal becomes weak. In other words, in the high frequency mobile communication system, it is necessary to form the beam to transmit signals that were assumed to be spread and transmitted in all directions in a cell in the typical LTE/LTE-Advanced.

FIG. 8 illustrates an antenna structure used for transmitting a signal by forming a beam in a high frequency mobile communication system.

Referring to FIG. 8, the BS may include one, two, or four antenna arrays (AAs), and each AA corresponds to two APs.

Each AP generates one of analog beams each formed independently from other APs.

Figure 9:
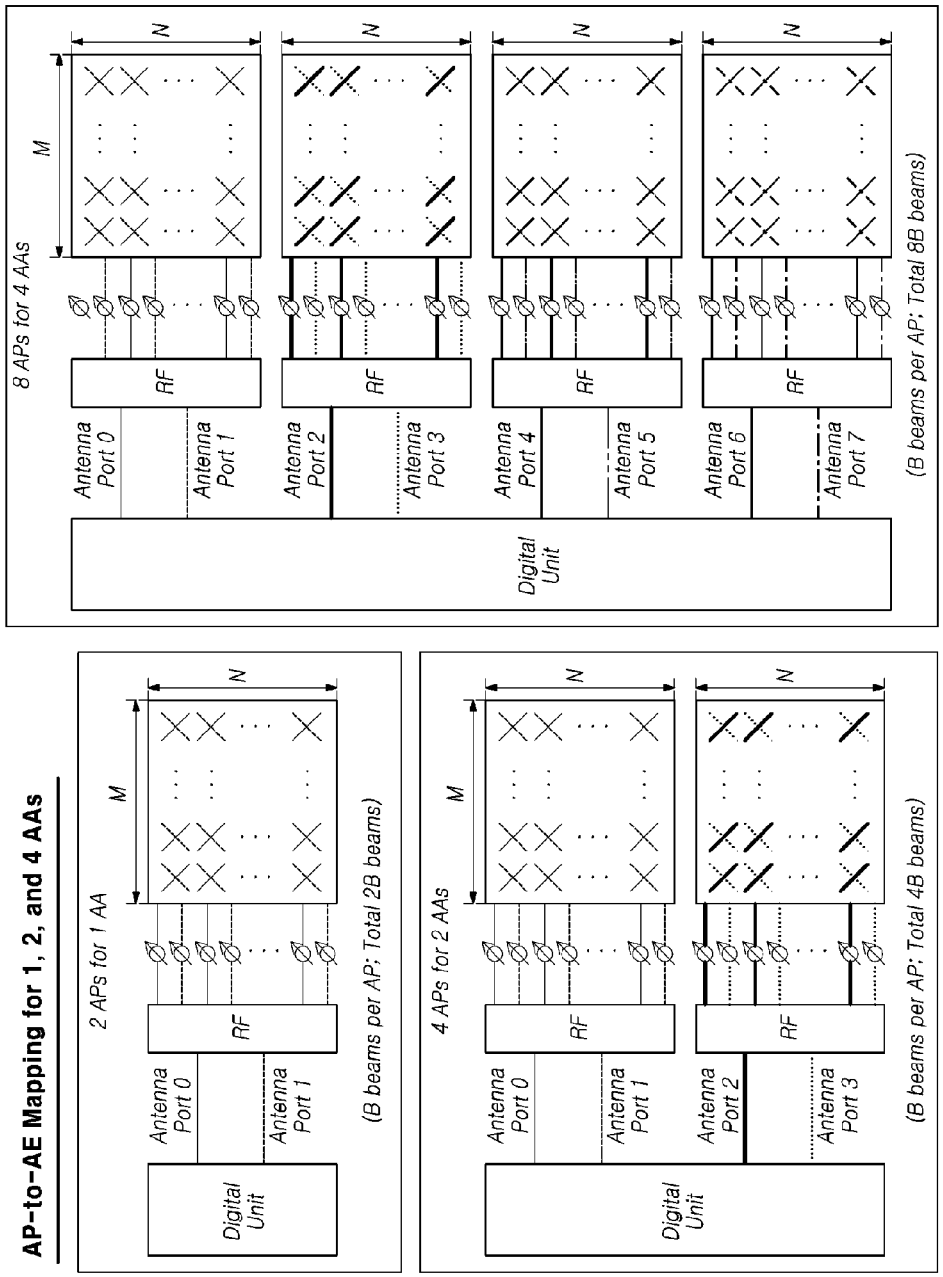
FIG. 9 is a diagram illustrating a mapping between an antenna port and an antenna element when each base station includes one, two, or four antenna arrays.

FIG. 9 illustrates a mapping between an AP and an antenna element when each BS includes one, two, or four AAs.

One AP may be connected to the same POLs in a specific AA to transmit the signal, and each AP may independently form a plurality of beams According to above-described antenna structure, the PSS and SSS are parts that need to be newly designed in the high frequency mobile communication system with respect to the typical LTE/LTE-Advanced. In the typical LTE/LTE-Advanced, since the PSS and SSS are transmitted to evenly detect the signal in all areas of a specific cell, only one pair of the PSS and SSS may be present in each cell. However, in the high frequency mobile communication system, the PSS and SSS also have directionality and a plurality pairs of PSSs and SSSs should be operated for each cell in order to enable the terminals in all areas of the cell to detect the PSS and SSS.

When it is assumed that the number of the beams to be applied to the PSS and SSS is N, the specific cell should operate N PSSs and SSSs. In addition, when the terminal receives a specific PSS and SSS, the terminal should identify the beam corresponding to the PSS and SSS in order to accurately obtain time-frequency synchronization of the corresponding cell.

FIG. 10 illustrates an operation of a BS that applies 14 or 12 beams to PSS and SSS per each AP and distributedly transmits the PSS and SSS applied with different beams to different OFDM symbols in one subframe.

That is, a specific beam is applied to one pair of PSS and SSS, and cell identifier information is included in a corresponding PSS and SSS. Therefore, the terminal may identify OFDM symbol timing and a cell identifier by identifying the PSS and SSS.

In addition, the BS may obtain subframe timing by transmitting an ESS to which the same beam as that applied to the PSS and SSS is applied in the same OFDM symbol.

In addition, a beam reference signal (BRS) is transmitted at the same OFDM symbol timing as that of the corresponding PSS, SSS, and ESS, and thus the terminal may identify beam information.

FIG. 10 illustrates the above-described operation. In particular, FIG. 10 shows transmitting a timing and beam acquisition (TBA) subframe with an interval of 5 ms.

Referring to FIG. 10, the TBA subframe occurs at every $K^{th}$ subframe such as 0, K, and 2K, and includes the PSS, SSS, ESS, and BRS.

The PSS, SSS, and ESS may be mapped to the middle of the TBA subframe, and the BRS may be mapped to the remainder of the TBA subframe to enable the terminal to measure various beams.

FIG. 11 illustrates functions of signals transmitted in the TBA subframe and a related structure in detail.

Referring to FIG. 11, in the TBA subframe, the PSS may be mapped to six resource blocks positioned in the middle of the TBA subframe, thereby obtaining the OFDM symbol timing.

The SSS may be mapped to six resource blocks positioned at an upper side of the resource blocks to which the PSS is mapped, thereby obtaining a cell ID.

The ESS may be mapped to six resource blocks positioned at a lower side of the resource blocks to which the PSS is mapped, thereby obtaining the subframe timing.

The BRS may be dispersed and mapped to the entire area except for the 18 resource blocks occupied by the PSS, SSS, and ESS. The BRS enables the terminal to identify a beam applied to a signal transmitted to the terminal so that the terminal measures the beam.

In this case, the BRS may be mapped to eight successive subcarriers among 12 successive subcarriers in the resource block to which the PSS, SSS, and ESS are not mapped, and another signal may be mapped to the remaining four subcarriers or a signal may not be mapped to the remaining four subcarriers.

FIG. 12 illustrates methods of determining positions of the resource blocks to which the BRS shown in FIG. 11 is transmitted.

Referring to FIG. 12, Option 1 shows a method of mapping the BRS at intervals of L resource blocks in an order of a resource block having a low index except for the middle 18 resource blocks Sync.

Alternatively, the BRS may be mapped at intervals of L resource blocks in both directions centered on the middle 18 resource blocks like Option 2.

In this case, the position of the resource block for starting the transmission of the BRS may be determined with various methods in each case.

For example, as shown in FIG. 12, the position of the resource block for starting the transmission of the BRS may be determined using a cell-ID and a function to such as f(A). Here, the cell-ID indicates the cell identifier obtained by the terminal from the PSS and SSS, and f(A) indicates a specific function value with A as an input.

Figure 13:
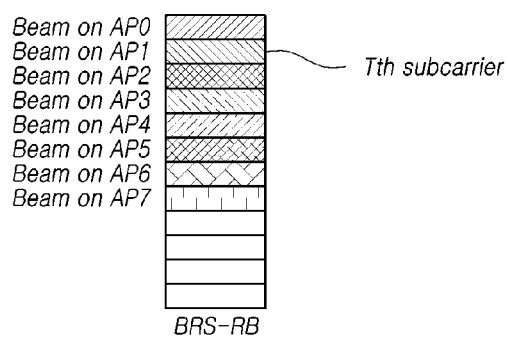
FIG. 13 is a diagram illustrating a mapping relationship between beams corresponding to each antenna port from which the beam reference signal is transmitted and a subcarrier in the resource.

FIG. 13 illustrates a mapping relationship between beams corresponding to each AP in a resource block from which a BRS described in FIG. 12 is transmitted and a subcarrier in the resource block.

In a resource block, a subcarrier where the mapping starts may be different for each cell identifier. No signal may be transmitted to a subcarrier that is not mapped to the AP, and additional other signals may be transmitted to the subcarrier that is not mapped to the AP. Here, f'(B) indicates a specific function value with B as an input.

FIG. 14 illustrates mapping relationships between a beam of each port and a subcarrier for a BRS with respect to a total AP number of a BS.

When there no antenna port (AP) mapped to a subcarrier, no signal may be transmitted to a corresponding subcarrier. As another mapping method, mapping may be performed to repeatedly transmit a reference signal of antenna ports (APs) that are mapped with subcarriers.

For example, in the case of a first method (Option 1), when the number of the APs is two, an AP0 and an AP1 are transmitted at $T^{th}$ and $(T+1)^{th}$ subcarriers respectively, and reference signals are not transmitted to the remaining subcarriers.

On the other hand, in the case of a second method (Option 2), when the number of the APs is two, the AP0 is repeatedly transmitted at $T^{th}$, $(T+2)^{th}$, $(T+4)^{th}$, and $(T+6)^{th}$ subcarriers, and the AP1 is repeatedly transmitted at $(T+1)^{th}$, $(T+3)^{th}$, $(T+5)^{th}$, and $(T+7)^{th}$ subcarriers.

In the present embodiments, a method for enabling a terminal to identify the number of the APs used in the BS may be i) a non-standalone method where an LTE cell related to a high frequency BS directly notifies the terminal and ii) a standalone method where a terminal tries to decode data signals by applying BRS according to a beam reference signal design method, identifies the number of the APs if the data signals are decoded, and performs related operations later. FIG. 15 illustrates such non-standalone method and standalone method.

FIG. 16 illustrates operations performed when the terminal receives signals that are present in the TBA subframe in an initial ultra-high frequency cell access situation.

That is, the terminal first receives the PSS in the initial access situation to obtain timing at which the OFDM symbols are transmitted, and additionally receives the SSS to obtain more accurate timing and an ID of a corresponding access cell (cell-ID). Next, the terminal receives the ESS to identify the order of the received OFDM symbols in a corresponding subframe, and obtains subframe timing.

In addition, the terminal receives the BRS and a PBCH to obtain a system frame number (SFN), and additionally identifies the number of BRS ports. That is, the terminal identifies a system to which the terminal is connected among cases shown in FIG. 9 by receiving the PBCH to identify the total port number of the BRS. In addition, the terminal receives the BRS to measure a channel between the terminal and the BS for each AA or each AP FIG. 17 illustrates methods of calculating and reporting radio resource management (RRM) information such as reference signal received power (RSRP) or reference signal received quality (RSRQ) information by a terminal that receives a channel from the BRS.

Here, definitions of the RSRP and the RSRQ may be easily expanded from definitions of the 3GPP TS 36.214 standard.

A first method (Alt 1) of receiving the BRS and calculating/reporting the RRM information by the terminal includes reporting i) indexes of OFDM symbols preferred based on an RSRP or RSRQ value in a specific TBA subframe of a specific cell by the terminal, ii) a combination of AP or AA indexes preferred based on the RSRP or RSRQ value for the BRS ports included in corresponding OFDM symbols, and iii) the RRM information for the combination to the BS from the terminal.

For example, when the OFDM symbols preferred by the terminal in the specific TBA subframe of the specific cell are number 1 and number 2, and when each of AA numbers 0, 1 and 3 are preferred in corresponding symbols, the terminal will report a corresponding OFDM symbol index, an AA combination, and related RRM information to the BS together with a cell-ID of a corresponding cell as follows:

Cell-ID+OFDM symbol 2+AA0+RRM information
Cell-ID+OFDM symbol 2+AA1+RRM information
Cell-ID+OFDM symbol 5+AA3+RRM information In FIG. 17, it is assumed that the combination of the AP and the AA is as follows:

AP0+AP1→AA0
AP2+AP3→AA1
AP4+AP5→AA2
AP6+AP7→AA3

However, the present embodiments are not limited thereto. For example, additional RRM information for each preferred AP may be reported in accordance with another embodiment. In addition, the RRM information may be obtained with respect to only the number of the APs obtained through the BRS or higher rank information and the obtained RRM information is reported in accordance with further another embodiment.

Referring to FIG. 17, a second method (Alt 2) of receiving the BRS and calculating/reporting the RRM information by the terminal may be reporting, by the terminal to the BS, all pieces of the RRM information for four arrays of the BRS or for eight ports of the BRS with respect to indexes of the OFDM symbols preferred based on the RSRP or RSRQ value in a specific TBA subframe of a specific cell.

For example, when the OFDM symbols preferred by the terminal in the specific TBA subframe of the specific cell are number 2 and number 5, the terminal will report a corresponding OFDM symbol index and all pieces of related RRM information to the BS together with a cell-ID of a corresponding cell with respect to all of AAs numbers 0, 1, 2, and 3 or APs 0, 1, 2, 3, 4, 5, 6, and 7 as follows:

Cell-ID+OFDM symbol 2+4 (or 8) RRM pieces
    Cell-ID+OFDM symbol 5+4 (or 8) RRM pieces Referring to FIG. 18, a third method (Alt 3) of receiving the BRS and calculating/reporting the RRM information by the terminal may be reporting, by the terminal to the BS, all pieces of the RRM information for B arrays of the BRS or 2B ports of the BRS with respect to indexes of the OFDM symbols preferred based on the RSRP or RSRQ value in a specific TBA subframe of a specific cell.

Here, B is a value obtained by dividing the number of BRS APs identified in the PBCH or the RRC by two.

For example, when the OFDM symbols preferred by the terminal in the specific TBA subframe of the specific cell are number 2 and number 5, the terminal will report i) a corresponding OFDM symbol index, ii) all pieces of related RRM information to the BS, and iii) a cell-ID of a corresponding cell with respect to all of AAs numbers 0, 1, and B-1 or APs numbers 0, . . . , and 2B-1 as follows:

Cell-ID+OFDM symbol 2+B (or 2B) RRM pieces
    Cell-ID+OFDM symbol 5+B (or 2B) RRM pieces Referring to FIG. 18, a fourth method (Alt 4) of receiving the BRS and calculating/reporting the RRM information by the terminal may be reporting, by the terminal to the BS, the RRM information for only AA0 or AP0 with respect to indexes of the OFDM symbols preferred based on the RSRP or RSRQ value in a specific TBA subframe of a specific cell.

For example, when the OFDM symbols preferred by the terminal in the specific TBA subframe of the specific cell are number 2 and number 5, the terminal will report i) a corresponding OFDM symbol index, ii) related RRM information to the BS, and iii) a cell-ID of a corresponding cell with respect to AA0 or AP0 in corresponding OFDM symbols as follows:

Cell-ID+OFDM symbol 2+RRM (for AA0 or AP0)
    Cell-ID+OFDM symbol 5+RRM (for AA0 or AP0)

Also in FIG. 18, it is assumed that two successive APs are mapped to one AA.

The methods of reporting the RRM information according to the embodiments of the present disclosure described above have different advantages and disadvantages according to overhead necessary for a report or calculation complexity necessary for receiving the RRM information by the terminal.

FIG. 19 illustrates methods of calculating and reporting a CSI such as a RI/PMI/CQI by a terminal receiving a channel from a BRS.

A first method of receiving the BRS and calculating/reporting the CSI by the terminal includes reporting i) indexes of OFDM symbols preferred in a specific TBA subframe of a specific cell by the terminal, ii) a combination of AA indexes included in to corresponding OFDM symbols, and iii) the CSI to the BS from the terminal.

In this case, the CSI indicates CSI corresponding to two ports for each AA considering that two APs are mapped to one AA.

For example, in a case where the OFDM symbols preferred by the terminal in the specific TBA subframe of the specific cell are number 2 and number 5 and each of AAs preferred in corresponding symbols are numbers 0, 1 and 3, the terminal will report a corresponding OFDM symbol index, an AA combination, and related 2-port CSI to the BS as follows:

OFDM symbol 2+AA0+2-port RI/PMI/CQI (for AP0-1)
    OFDM symbol 2+AA1+2-port RI/PMI/CQI (for AP2-3)
    OFDM symbol 5+AA3+2-port RI/PMI/CQI (for AP6-7)

Also in FIG. 19, it is assumed that the combination of the AP and the AA is as follows:

AP0+AP1→AA0
    AP2+AP3→AA1
    AP4+AP5→AA2
    AP6+AP7→AA3

With respect to the method of calculating/reporting the above-described three pieces of the CSI, the terminal may always set the CSI to be calculated/reported with respect to a combination of a selected one OFDM symbol and an array of the BRS. In addition, in the case of an initial access situation, corresponding CSI may be included in an UL data channel transmitted first by the terminal and may be transmitted.

On the other hand, when the terminal already accesses a cell, corresponding CSI may be reported through a separate feedback channel in a subframe appearing k subframes after a subframe transmitting the BRS. A corresponding k value may be set as a value equal to a subframe difference for a case where the terminal receives data and reports the HARQ feedback for the data. Therefore, k may be designed not to be conflicted with a feedback in two cases.

In addition, frequency resources for reporting the CSI may be configured by the BS through the RRC or may be determined by the cell-ID and a terminal identifier.

In the ultra-high frequency system according to the embodiments, a beam refinement reference signal (BRRS) may be additionally transmitted in addition to the BRS to adjust a transmission beam (Tx beam) transmitted from the BS to the terminal or adjust a reception beam (Rx beam) received by the terminal.

Figure 20:
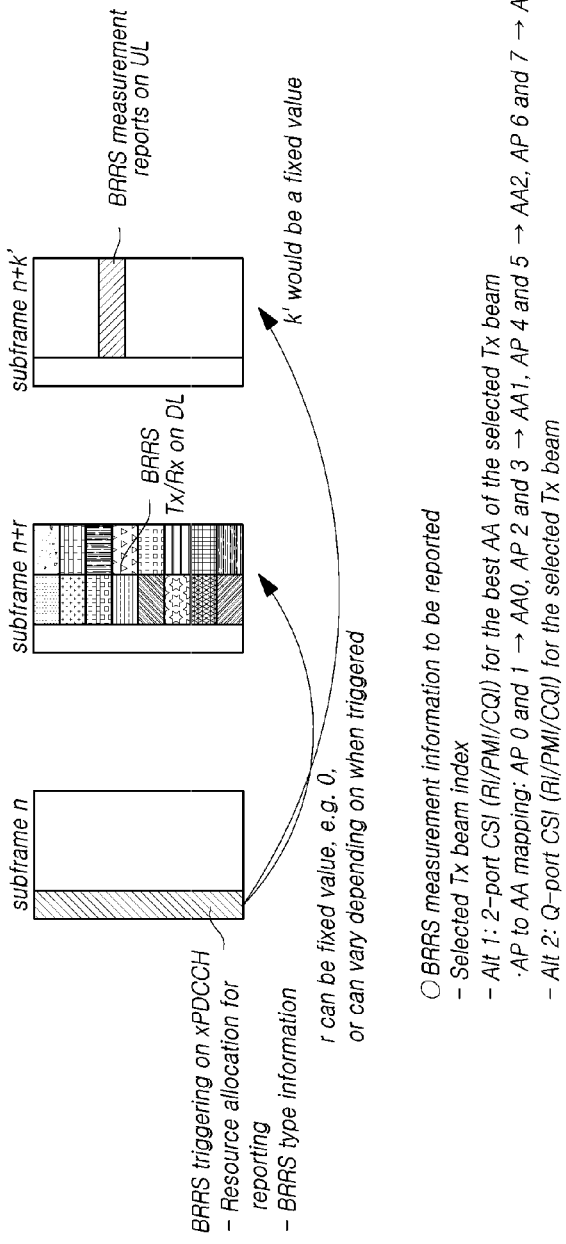
FIG. 20 is a diagram illustrating transmitting a beam refinement reference signal by the base station scheduling the beam refinement reference signal.

FIG. 20 illustrates transmitting a BRRS by a BS scheduling a BRRS.

As shown in FIG. 20, when the BRRS is scheduled in a subframe n, the BRRS may be transmitted in an $r^{th}$ subframe thereafter. Then, in a $k'^{th}$ subframe thereafter, the terminal may report feedback information for the received BRRS to the terminal.

Here, the r may be fixed to a value such as zero or may be determined to be a different value according to an index of a scheduled subframe.

In addition, the k' may be designed to have a fixed value. Here, as feedback information for the BRRS transmitted in the $k'^{th}$ subframe after the scheduling, Tx beam index information, AA index information preferred for a corresponding Tx beam, and related CSI may be reported as in the BRS. Alternatively, preferred Tx beam index information and Q-port CSI may be reported. Here, Q may be a value identified through the PBCH or the RRC.

FIG. 21A and FIG. 21B illustrate a structure of time frequency resources for transmitting the above-described BRRS.

When the BRRS is transmitted in a specific subframe, the BRRS may enable a BRRS for a specific AP to be transmitted through a plurality of successive subcarriers. In addition, with respect to OFDM symbols applied with the same Tx beam, the BRRS may be transmitted while applying hopping to be transmitted on different frequency resources.

When the BRRS for a plurality of Tx beams is transmitted, the BRRS may be transmitted by repeatedly transmitting the same BRRS structure several times and applying different Tx beams to each BRRS structure.

The terminal may adjust the Rx beam through a plurality of OFDM symbols of BRRSs to which one specific Tx beam is applied. When a plurality of Tx beams are applied, the terminal may report a preferable Tx beam in the CSI reporting situation thereafter.

As shown in FIGS. 21A and 21B, eight OFDM symbols are used with respect to one Tx beam. However, the present disclosure is not limited thereto. Four or other values may be used, and the BRRS may be transmitted by applying hopping in a similar method.

Figure 22:
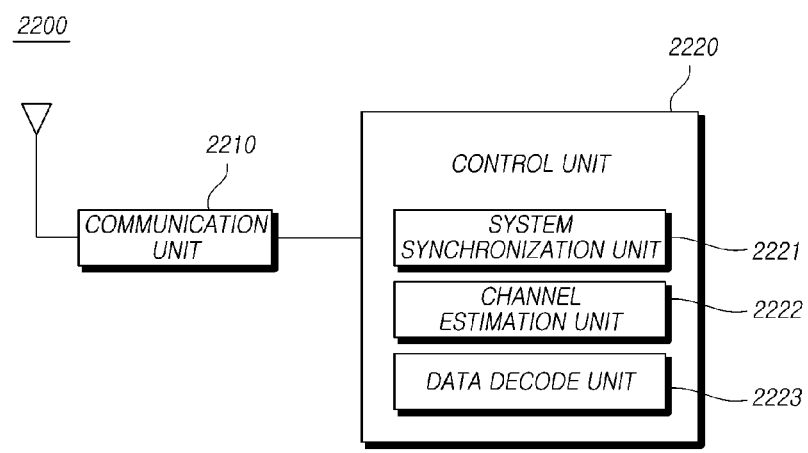
FIG. 22 is a diagram illustrating a terminal in an ultra-high frequency mobile communication system according to an embodiment.

Alternatively, as still another method, as shown in FIG. 22, the BRRS may enable the BRRS resource for a specific AP to be dispersed and transmitted to the entire frequency area. Similarly, hopping may be applied to each OFDM symbol and the BRRS having the same pattern may be transmitted several times for each OFDM symbol. Therefore, a Tx beam adjustment is possible through Tx beam selection and reporting.

FIG. 22 is a diagram showing a terminal 2200 in an ultra-high frequency mobile communication system according to embodiments.

Referring to FIG. 22, the terminal 2200 according to embodiments may include a communication unit 2210 and a control unit 2220. Further, the control unit 2220 may include a system synchronization unit 2221, a channel estimation unit 2222, and a data decoding unit 2223.

The communication unit 2210 receives a signal such as the PSS and SSS, the RS, and data, and transfers the signal to the control unit 2220.

The control unit 2220 may obtain synchronization and identity beam information from the transferred received signals, and receive the RS for each purpose of the RS. In addition, the control unit 2220 may generate channel estimation and feedback information according to the RS and may decode data by utilizing another RS. The feedback information may be reported to the BS through the communication unit 2210.

In, FIG. 22, the system synchronization unit 2221, the channel estimation unit 2222, and the data decoding unit 2223 are illustrated as included in the control unit 2220 as partial functions of the control unit 2220. However, the present disclosure is not limited thereto. For example, the system synchronization unit 2221, the channel estimation unit 2222, and the data decoding unit 2223 may be implemented as an independent elements from the control unit 2220.

Figure 23:
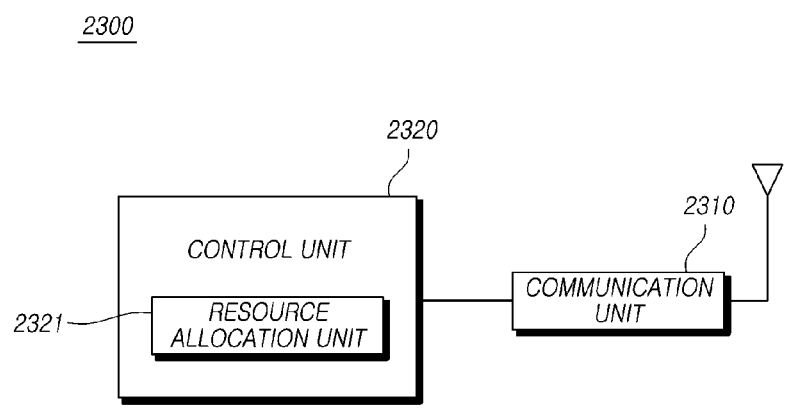
FIG. 23 is a diagram illustrating a base station in an ultra-high frequency mobile communication system according to an embodiment.

FIG. 23 is a diagram illustrating a BS 2300 in an ultra-high frequency mobile communication system according to embodiments.

Referring to FIG. 23, the BS 2300 according to the present embodiments may include a communication unit 2310 and a control unit 2320. Further, the control unit 2320 may include a resource allocation unit 2321.

The BS 2300 transmits a signal such as the PSS and SSS, the RS, and data to the terminal, and receives data, the channel feedback information, and the like from the terminal.

The control unit 2320 generates a predetermined signal for each type, maps the signal to resources, and maps data of the terminal to specific resources by utilizing the feedback information. To this end, the control unit 2320 may have a separate resource allocation unit 2321 or may perform a corresponding function as some of the functions of the control unit 2320.

Figure 24:
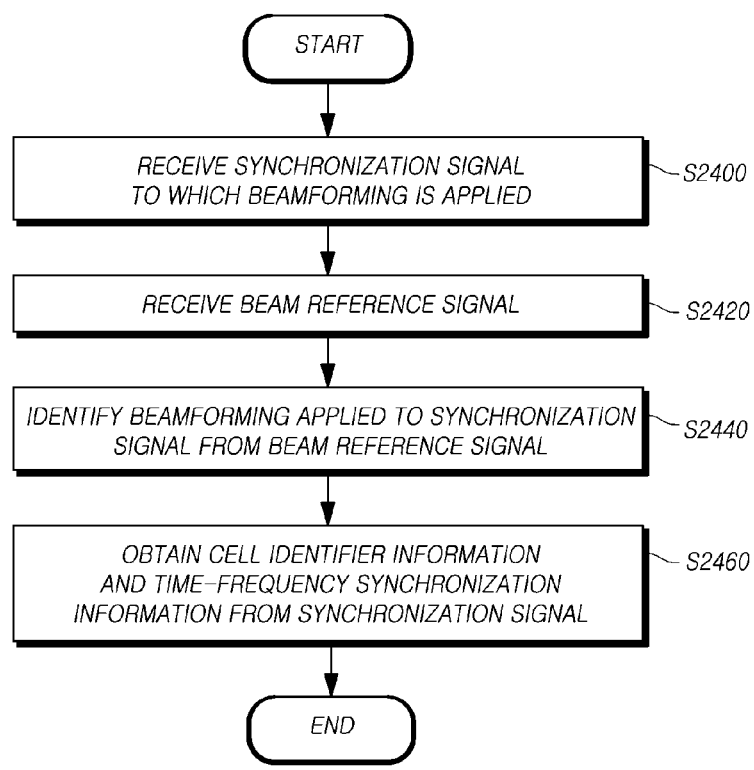
FIG. 24 is a flowchart illustrating a signal transmission and reception method of a terminal according to an embodiment.

FIG. 24 is a flowchart illustrating a method of receiving a signal by a terminal in a wireless communication system according to embodiments.

Referring to FIG. 24, the terminal receives a synchronization signal to which beamforming is applied through a resource block consisting of subcarriers set to multiples of 15 kHz from the BS (S2400).

Here, an interval of the subcarrier may be set to an interval five times or ten times as large as 15 kHz.

The terminal receives the BRS from the BS at the same symbol timing as that of a symbol receiving the synchronization signal (S2420).

The BRS may be positioned at regular intervals in a resource block, except for the resource block assigned to the synchronization signal in a subframe for transmitting the synchronization signal and the BRS.

For example, the synchronization signal may be positioned in the middle resource block of the subframe, and the BRS may be sequentially positioned from a subcarrier having a low index in the resource block except for the resource block occupied by the synchronization signal.

Alternatively, the BRS may be positioned in both directions of the resource block in which the synchronization signal is positioned at regular intervals.

In this case, the BRS may be mapped to eight successive subcarriers among 12 subcarriers in the resource block in which the synchronization signal is not positioned. In addition, another signal may be mapped to the remaining four subcarriers or no signal to may be mapped to the remaining four subcarriers.

The terminal identifies the beamforming applied to the synchronization signal from the received BRS (S2440).

In addition, the terminal obtains cell identifier information, time-frequency synchronization information, and the like from the synchronization signal (S2460).

Figure 25:
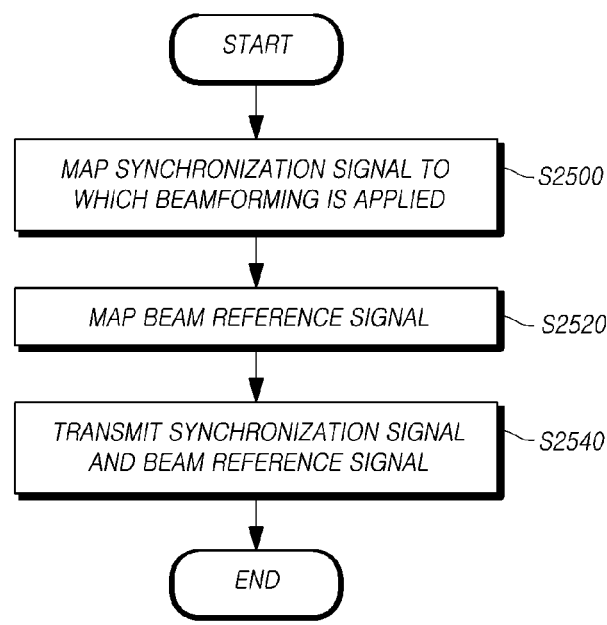
FIG. 25 is a flowchart illustrating a signal transmission and reception method of a base station according to an embodiment.

FIG. 25 illustrates a method of transmitting a signal by a BS in a wireless communication system according to embodiments.

Referring to FIG. 25, the BS maps a beamforming applied synchronization signal to a resource block consisting of subcarriers that are set to multiples of 15 kHz (S2500).

The BS maps a BRS to a symbol timing mapped with the synchronization signal, in order to identify the beamforming applied to the synchronization signal (S2520).

In this case, the BRS may be sequentially positioned in a resource block except for the resource block with the synchronization signal positioned in a subframe, or may be positioned in both directions of the resource block in which the resource block is positioned.

In addition, the BRS may be mapped to eight successive subcarriers among 12 subcarriers, and in this case, another signal may be transmitted or no signal may be transmitted to the remaining four subcarriers.

The BS transmits the BRS that enables the BS to identify the synchronization signal to which the beamforming is applied and the beamforming applied to the synchronization signal at the same symbol timing to the terminal (S2540).

Therefore, in the high frequency mobile communication system, the terminal may measure the beam applied to the synchronization signal using the synchronization signal and the BRS and obtain information on a cell identifier and time-frequency synchronization from the synchronization signal.

Figure 26:
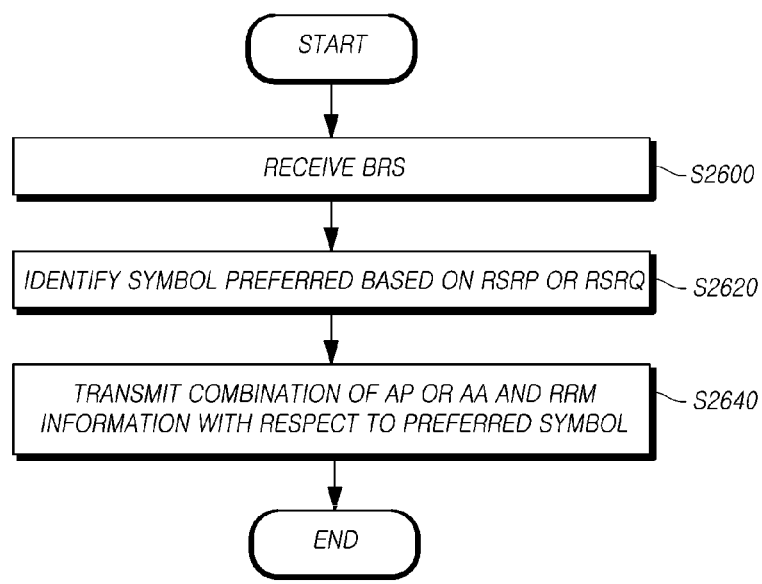
FIG. 26 is a flowchart illustrating a method of a terminal for receiving feedback information according to an embodiment.

FIG. 26 illustrates a method of a terminal for receiving BRS and transmits feedback information in accordance with at least one embodiment.

Referring to FIG. 26, the terminal receives the BRS from the BS (S2600).

The terminal identifies OFDM symbols preferred based on the RSRP or RSRQ value in the TBA subframe in which the BRS is received (S2620).

The terminal transmits at least one of i) the RRM information and ii) the CSI to the BS (S2640). Herein, the RRM information and the CSI are related to the AP or the AA for the preferred OFDM symbols.

For example, the terminal may transmit i) the combination of indexes of the AP or the AA which is preferred based on the RSRP or RSRQ value for the BRS ports included in the preferred OFDM symbols and ii) the feedback information such as the RRM information or the CSI for the combination.

Alternatively, the feedback information for all APs or AAs for the preferable OFDM symbols may be transmitted, or the feedback information for a specific AP or a specific AA may also be transmitted.

Alternatively, the feedback information for B AA or 2B APs for the preferable OFDM symbols may be transmitted. Here, B is a value obtained by dividing the number of BRS APs identified in the PBCH or the RRC by two.

Figure 27:
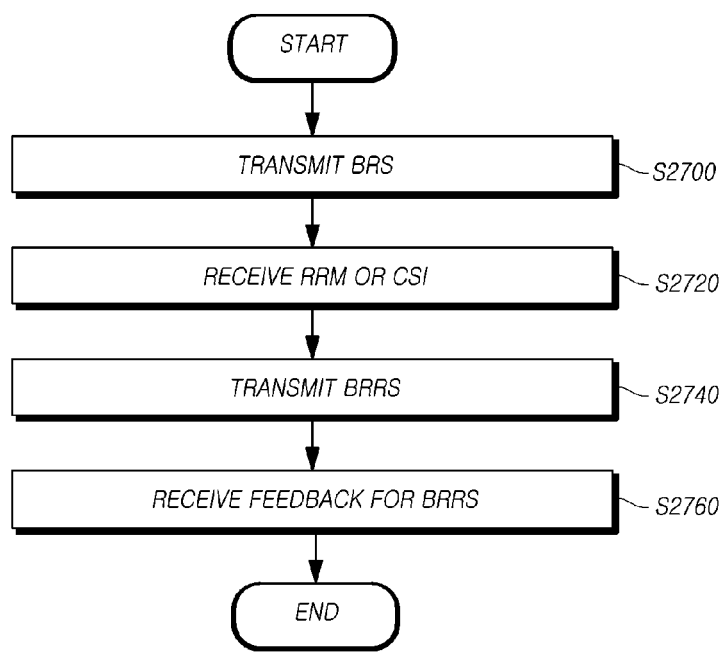
FIG. 27 is a flowchart illustrating a method of a base station for receiving the feedback information according to an embodiment.

FIG. 27 illustrates a method of a BS for receiving feedback information from a terminal according to embodiments.

Referring to FIG. 27, the BS transmits the BRS to the terminal (S2700). The BS receives the feedback information such as the RRM information or the CSI for the BRS (S2720).

In this case, the BS may receive the feedback information in a subframe to appearing k subframes after a subframe in which the BRS is transmitted. The k may be a value equal to a subframe difference when the terminal transmits the HARQ feedback for the received data.

In addition, the BS may transmit the BRRS for adjusting a transmission beam transmitted to a specific terminal or adjusting a reception beam of the terminal in the ultra-high frequency mobile communication system to the terminal (S2740).

In this case, when the BRRS is scheduled in a subframe n, the BRRS may be transmitted in an $(n+r)^{th}$ subframe. The r may be a fixed value or a value determined according to an index of the scheduled subframe.

In a case where the BRRS is transmitted in the $(n+r)^{th}$ subframe, the BS may receive the feedback information for the BRRS in an $(n+r+k')^{th}$ subframe (S2760).

Here, the k' may be designed to have a fixed value. The BS may adjust the transmission beam of the BS or the reception beam of the terminal on the basis of the feedback information for the BRRS.

A reference content or reference documents described in the above-described embodiments is omitted for simplifying the description of the specification, and configures a part of the present specification. Therefore, it is to be construed that adding the reference content and some contents of the reference documents to the present specification or describing the reference content and some contents of the reference documents in the claims corresponds to the scope of the present invention The above embodiments of the present disclosure have been described only for illustrative purposes, and those skilled in the art will appreciate that various modifications and changes may be made thereto without departing from the scope and spirit of the present disclosure. Therefore, the embodiments of the present disclosure are not intended to limit, but are intended to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. A method of transmitting, by a terminal, feedback information in an ultra-high frequency mobile communication system, the method comprising:
  receiving, by the terminal, a beam reference signal from a base station;
  identifying a preferable symbol based on at least one of a reference signal received power and a reference signal received quality in a subframe in which the beam reference signal is received; and
  transmitting, to the base station, at least one of radio resource management information and channel status information for an antenna port or an antenna array with respect to the preferable symbol,
  wherein the transmitting comprises transmitting at least one of the radio resource management information and the channel status information for one of a preferable antenna port and an antenna array based on the reference signal received power or the reference signal received quality to the base station with respect to a beam reference signal port included in the preferable symbol.

2. The method of claim 1, wherein the transmitting comprises transmitting at least one of the radio resource management information and the channel status information in a subframe that is a $K^{th}$ subframe after the subframe in which the beam reference signal is received, where K denotes a value equal to a difference between a subframe in which the terminal receives data and a subframe in which the terminal transmits feedback information for the data.

3. The method of claim 1, further comprising:
  receiving a beam refinement reference signal from the base station; and
  transmitting feedback information for the received beam refinement reference signal to the base station,
  wherein the beam refinement reference signal is scheduled in an $N^{th}$ subframe and is received in an $(N+R)^{th}$ subframe, and the feedback information is transmitted in an $(N+R+K')^{th}$ subframe, where N, R, K are integer number greater than and equal to 1.

4. The method of claim 3, wherein the R is one of a fixed value and a value determined according to an index of the scheduled subframe.

5. The method of claim 1, wherein the receiving comprises receiving the beam reference signal in eight successive subcarriers and receiving another signal in the remaining four subcarriers in a unit of 12 subcarriers in a symbol for transmitting the beam reference signal.

6. The method of claim 1, wherein the receiving comprises:
  receiving, by the terminal, i) a synchronization signal to which beamforming is applied at the same symbol timing and ii) the beam reference signal through a resource block consisting of subcarriers set to multiples of 15 kHz from the base station;
  identifying the beamforming applied to the synchronization signal based on the beam reference signal; and obtaining cell identifier information and time-frequency synchronization information from the synchronization signal.

7. A method of transmitting, by a terminal, feedback information in an ultra-high frequency mobile communication system, the method comprising:
- receiving, by the terminal, a beam reference signal from a base station;
- identifying a preferable symbol based on at least one of a reference signal received power and a reference signal received quality in a subframe in which the beam reference signal is received; and
- transmitting, to the base station, at least one of radio resource management information and channel status information for at least one antenna port or at least one antenna array with respect to the preferable symbol;
- wherein the transmitting comprises transmitting at least one of the radio resource management information and the channel status information for one of B antenna arrays and 2B antenna ports with respect to the preferable symbol, where B is a value obtained by dividing a number of identified beam reference signal antenna ports by two.

8. A method of receiving, by a base station, feedback information in an ultra-high frequency mobile communication system, the method comprising:
- transmitting a beam reference signal to a terminal; and
- receiving at least one of radio resource management information and channel status information for one of an antenna port and an antenna array with respect to a preferable symbol based on at least one of a reference signal received power and a reference signal received quality in a subframe that transmits the beam reference signal,
- wherein the receiving comprises receiving at least one of the radio resource management information and the channel status information for one of a preferable antenna port and antenna array based on at least one of the reference signal received power and the reference signal received quality with respect to a beam reference signal port included in the preferable symbol.

9. The method of claim 8, wherein the receiving comprises receiving at least one of the radio resource management information and the channel status information in a subframe that is a $K^{th}$ subframe after the subframe transmitting the beam reference signal, where K denotes a value equal to a difference between a subframe in which the base station transmits data and a subframe in which the base station receives feedback information for the data.

10. The method of claim 8, further comprising:
- transmitting a beam refinement reference signal to the terminal; and
- receiving feedback information for the transmitted beam refinement reference signal,
- wherein the beam refinement reference signal is scheduled in an $N^{th}$ subframe and is received in an $(N+R)^{th}$ subframe, and the feedback information is received in an $(N+R+K')^{th}$ subframe, where N, R, K are integer numbers greater than and equal to 1.

11. The method of claim 10, wherein the R is one of a fixed value and a value determined according to an index of the scheduled subframe.

12. The method of claim 8, wherein the transmitting comprises transmitting the beam reference signal in eight successive subcarriers and transmitting another signal in the remaining four subcarriers in a unit of 12 subcarriers in a symbol transmitting the beam reference signal.

13. The method of claim 8, wherein the transmitting comprises:
- mapping a synchronization signal to which a beamforming is applied to a resource block consisting of subcarriers set to multiples of 15 kHz by the base station;
- mapping the beam reference signal for identifying the beamforming applied to the synchronization signal to a symbol timing at which the synchronization signal is mapped; and
- transmitting the synchronization signal and the beam reference signal to the terminal.

* * * * *